United States Patent
Cinek et al.

(10) Patent No.: US 10,976,925 B2
(45) Date of Patent: Apr. 13, 2021

(54) NOTIFICATION SHADE WITH ANIMATED REVEAL OF NOTIFICATION INDICATIONS

(71) Applicant: Google LLC, Mountain View, CA (US)

(72) Inventors: Selim Flavio Cinek, San Francisco, CA (US); Justin R. Barber, Menlo Park, CA (US); Allyson E. Tong, San Jose, CA (US); Daniel Park, Sunnyvale, CA (US); William Levi Frohn, Kenmore, WA (US); Madeleine Denise Mellor, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/472,243

(22) PCT Filed: Mar. 8, 2018

(86) PCT No.: PCT/US2018/021563
§ 371 (c)(1),
(2) Date: Jun. 21, 2019

(87) PCT Pub. No.: WO2018/165437
PCT Pub. Date: Sep. 13, 2018

(65) Prior Publication Data
US 2020/0192566 A1    Jun. 18, 2020

Related U.S. Application Data

(60) Provisional application No. 62/469,382, filed on Mar. 9, 2017.

(51) Int. Cl.
*G06F 3/0488* (2013.01)
*G06F 3/0481* (2013.01)
(Continued)

(52) U.S. Cl.
CPC ........ *G06F 3/04886* (2013.01); *G06F 3/0482* (2013.01); *G06F 3/0488* (2013.01);
(Continued)

(58) Field of Classification Search
CPC ............. G06F 3/04886; G06F 3/04817; G06F 3/0482; G06F 3/04842; G06F 3/0488;
(Continued)

(56) References Cited

U.S. PATENT DOCUMENTS 7,996,045 B1 *   8/2011  Bauer .................. G06F 3/0488
                                                          455/566
8,775,963 B2 *   7/2014  Mujkic ............. H04M 1/72586
                                                          715/772
(Continued)

FOREIGN PATENT DOCUMENTS

WO         2012170446 A2    12/2012

OTHER PUBLICATIONS

Communication Pursuant to Rules 161(1) and 162 EPC dated Jul. 11, 2019, from counterpart European Application No. 187146543, 3 pp.

(Continued)

*Primary Examiner* — Tadesse Hailu
(74) *Attorney, Agent, or Firm* — Shumaker & Sieffert, P.A.

(57) ABSTRACT

A computing device is described that displays a set of graphical elements in a status bar of a graphical user interface. Each graphical element corresponds to a different pending notification. While expanding a notification shade from the status bar, the device displays the graphical elements within an area of the notification shade that is adjacent to a leading edge of the notification shade. Responsive to determining that a particular notification message is newly visible, the device removes, a particular graphical element (Continued)

that corresponds to the particular notification message, and displays the particular graphical element within the particular notification message. In this manner, interaction with the notification area may be more efficient, as during a process of expanding or contracting this area, the user may be informed the underlying state of the set of pending notifications as a whole.

14 Claims, 17 Drawing Sheets

(51) Int. Cl.
| | |
|---|---|
| G06F 3/0482 | (2013.01) |
| G06F 9/451 | (2018.01) |
| H04M 19/04 | (2006.01) |
| G06F 3/0484 | (2013.01) |
| H04L 12/58 | (2006.01) |
| H04W 68/00 | (2009.01) |
| H04M 1/72472 | (2021.01) |
| H04M 1/72484 | (2021.01) |

(52) U.S. Cl.
CPC ...... *G06F 3/04817* (2013.01); *G06F 3/04842* (2013.01); *G06F 9/451* (2018.02); *H04L 51/24* (2013.01); *H04M 1/72472* (2021.01); *H04M 1/72484* (2021.01); *H04M 19/042* (2013.01); *H04M 19/047* (2013.01); *H04M 19/048* (2013.01); *H04W 68/005* (2013.01)

(58) Field of Classification Search
CPC .... G06F 9/451; H04L 51/24; H04M 1/72597; H04W 68/005
See application file for complete search history.

(56) References Cited

U.S. PATENT DOCUMENTS

| | | | | |
|---|---|---|---|---|
| 2011/0004845 | A1* | 1/2011 | Ciabarra | G06F 3/0481 715/808 |
| 2012/0117507 | A1* | 5/2012 | Tseng | H04W 4/50 715/774 |
| 2012/0204191 | A1* | 8/2012 | Shia | G06Q 10/10 719/318 |
| 2013/0007665 | A1* | 1/2013 | Chaudhri | G06F 9/451 715/830 |
| 2013/0111395 | A1* | 5/2013 | Ying | G06F 3/0482 715/783 |
| 2014/0181222 | A1* | 6/2014 | Geris | H04L 51/24 709/206 |
| 2014/0237378 | A1* | 8/2014 | Gonen | G06F 3/04817 715/745 |
| 2015/0143294 | A1 | 5/2015 | Piccinato et al. | |
| 2016/0034695 | A1* | 2/2016 | Won | G06F 21/32 726/28 |
| 2016/0080551 | A1* | 3/2016 | Tseng | G06F 3/0481 455/418 |
| 2016/0192111 | A1* | 6/2016 | Choi | H04W 4/70 455/507 |
| 2016/0196014 | A1* | 7/2016 | Qiao | G06F 3/0482 715/765 |
| 2018/0109639 | A1* | 4/2018 | Skillman | G06F 3/0482 |
| 2018/0174190 | A1* | 6/2018 | Ferreira | G06Q 30/0246 |

OTHER PUBLICATIONS

Response to Communication Pursuant to Rules 161(1) and 162 EPC dated Jul. 11, 2019, from counterpart European Application No. 18714654.3, filed Jan. 2, 2020, 12 pp.
International Search Report & Written Opinion from International Application No. PCT/US2018/021563, dated May 30, 2018, 14 pp.
Chapter II Demand Request from International Application No. PCT/US2018/021563, filed Aug. 20, 2018, 9 pp.
Written Opinion from International Application No. PCT/US2018/021563, dated Feb. 19, 2019, 7 pp.
Response to Written Opinion dated Feb. 19, 2019, from International Application No. PCT/US2018/021563, filed Mar. 21, 2019, 10 pp.
International Preliminary Report on Patentability from nternational Application No. PCT/US2018/021563, dated May 17, 2019, 12 pp.
Notice of Intent to Grant and Text Intended to Grant from counterpart European Application No. 18714654.3, dated Jul. 28, 2020, 72 pp.
Communication under Rule 71(3) EPC from counterpart European Application No. 18714654.3, dated Dec. 22, 2020, 7 pp.

* cited by examiner

NOTIFICATION SHADE WITH ANIMATED REVEAL OF NOTIFICATION INDICATIONS

This application is 371 application of PCT Application No. PCT/US2018/021563, filed Mar. 8, 2018, which claims the benefit of U.S. Provisional Application No. 62/469,382, filed Mar. 9, 2017, the entire contents of each of which are hereby incorporated by reference.

BACKGROUND

Some applications or services may generate "notifications" for alerting a user to new or interesting information for a variety of reasons. A computing device may display graphical indications of notifications received from applications executing at, or services accessible to, the computing device, in among other ways, as notification messages in a notification area of a graphical user interface (e.g., a notification pane, a notification window, a notification shade) and/or as "notification badges". Each notification message contained in a notification area may be made up of one or more graphical elements (e.g., icons, actionable elements), text (e.g., a title, detailed information), and/or other contents. Instead of being displayed in a notification area, a notification badge is typically shown as a graphical element overlapping or adjacent to a launch icon and indicates a total quantity of notifications currently pending (e.g., unviewed, unheard, unfelt, or otherwise not cleared) for the particular application or service associated with the launch icon. Some computing devices receive a large quantity of notifications—as such, their display (whether as multiple messages in a notification area and/or as multiple notification badges) may cause unwanted confusion, clutter, or annoyance.

SUMMARY

In general techniques of this disclosure are directed managing notifications and outputting indications of notifications as part of a graphical user interface (GUI) of a computing device. A computing device may receive notification data (referred to herein simply as a "notification") generated by an application executing at, or a service accessible to, the computing device (otherwise referred to herein as "a notification source"). When the computing device receives a notification, the computing device may process the notification and display a graphical indication of the underlying notification as part of a GUI of the computing device.

The graphical indication of the notification may take the form of a notification badge displayed adjacent to, or as part of, a launch icon of an application or service that generated the notification. However, unlike a typical notification badge that merely indicates a total quantity of notifications currently pending for the application or service that is associated with the launch icon, the example notification badge may reflect content of the pending notification(s). For example, if a notification is for alerting a user of the computing device to a message from a particular sender, the badge icon may be a graphic (e.g., icon) or image associated with the particular sender. The user may be further informed of the consequences of interactions with the computing device such that a decision can be made in light of knowledge otherwise not available to the user. Accordingly, in reflecting content of the notification, the badge icon may facilitate efficient interaction with the computing device by resolving one or more ambiguities that would otherwise arise. A reduction in the processing load on the device may thereby be achieved. Displaying notification badges that reflect the content of pending notifications may reduce anxiety and/or confusion some users may have from seeing other types of notification badges.

After displaying a notification badge at or near a particular launch icon, the computing device may detect a user input that selects the particular launch icon. While one type of user input (e.g., a tap input) that selects the particular launch icon may cause the computing device to execute the application or access the service associated with the launch icon, a different type of user input (e.g., a long press) that selects the particular launch icon may cause the computing device to display (e.g., near the launch icon being selected) a message preview of one or more of the individual notifications associated with the notification badge. For example, if the computing device receives multiple notifications for alerting a user of the computing device to multiple messages received from multiple senders, the computing device may cause the message preview to include a respective notification message for each of the multiple notifications, where each notification message may include one or more graphical elements (e.g., icons, actionable elements), text (e.g., a title, detailed information), and/or other contents displayed within the message preview. A user may be able to more quickly interact with a particular notification message from the message preview in a similar way that he or she may interact with a notification message when the notification message is displayed in a notification area of the GUI.

The computing device may display a graphical indication of a notification as a notification message in a notification area of the GUI. The notification area may be a notification pane, notification window, or notification shade that shows notification messages for each notification received by the computing device that has not yet been viewed, read, heard, or otherwise cleared.

To improve usability and reduce interaction time between a user and the notification area, or otherwise promote more efficient user interactions with notifications, the computing device may categorize notifications and display notification messages of the notifications in a ranked order of categorical-importance that is tied to how notification messages are to be presented when presented in a notification pane or other notification area of a GUI. For example, the computing device may categorize a notification as being either: an important and ongoing type notification, a person-to-person type notification, a regular type notification, a "by-the-way" type notification, or a system informational notification and then display graphical indications of the notifications in accordance with their categorical-importance.

The notification area may be divided into multiple sections where each section is associated with a particular category. The computing device may display notifications that have a higher-ranked categorical-importance in a more prominently displayed section of the notification area (e.g., in a top-section or a foreground section) and the computing device may display notifications that have a lower-ranked categorical-importance in less prominently displayed sections of the notification area (e.g., in bottom-sections or background sections). For example, if the notification area is a notification shade that unfurls from an upper edge of the GUI (e.g., a status bar) when brought into view, the computing device may display important and ongoing type notifications in a most prominent section of the notification shade (e.g., the upper-most area), person-to-person type notifications in a next most prominent section of the notification shade (e.g., the second to upper-most area), regular type notifications in a middle section of the notification shade, "by-the-way" type notifications in a next-to-least prominent section of the notification shade (e.g., the second to lower-most area), and system informational notifications in a least prominent section of the notification shade (e.g., the lower-most area). Appropriate categorization of notifications may provide a user with information relating to underlying operation of the computing device, and may for example immediately indicate the significance of one or more notifications to that operation.

Each notification source may generate various types of notifications and the computing device may manage the notifications using notification channels. That is to enable an application or service to define its own classification, prioritization, and settings for its different types of notifications, the computing device may enable an application or service to define one or more "channels". Each channel may have a respective label, alert setting(s) (e.g., sound, vibration, banner, etc.), prioritization level, channel graphic, and other parameters. Upon generating a notification, the application or service may assign that notification to a particular channel. Accordingly, a user may be provided with an indication of the manner in which a given notification is being handled by the computing device. This may provide further information on the notification itself and allow efficient interaction in light of the knowledge thereby provided. A notification settings menu of the GUI may enable user control over some or all of the notification parameters (e.g., prioritization, alert settings, and the like) for a particular channel and may further enable user control over how the computing device uses and/or stores personal information that may be associated with the notifications so that the personal information remains private or is not stored at all.

Unlike other computing devices that may simply output all notifications from a particular application or service using the same label, alert setting, and prioritization level, the computing device may instead output notifications from an application or service using the label, alert setting, and prioritization level of the channel in which each notification belongs. In this way, as an application or service generate notifications for a variety of reasons, the application or service may have finer control over how its different types of notifications get grouped and/or output as part of the GUI of the computing device.

To further improve usability and reduce interaction time between a user and a notification area, the computing device may display an individual notification graphical element (e.g., a channel graphic, a notification icon, a badge icon, or other graphic or image) for each pending notification or group of pending notifications, in a status bar region of the GUI or other designated region of the GUI. The graphical element may correspond to a category of notification, a channel, and/or other attribute of the notification.

For example, the notification area may be a notification shade that appears collapsed behind a status bar region of the GUI when hidden from view and appears to expand from behind the status bar region when pulled into view. When collapsed, the computing device may display an individual graphical element for each pending notification in the status bar region. As the notification shade expands, the computing device may animate the graphical elements and cause the graphical elements to appear to move with the leading edge of the notification shade as the shade comes into view from behind the status bar. As an individual notification message within the notification shade comes into view, the computing device may further animate the respective graphical element that is tied to the notification associated with the individual notification message to move from the leading edge region of the notification shade to the area of the notification shade in which the notification message is displayed. In this way, when the notification area is collapsed, the computing device provides graphical elements in a status bar region as an indication of the quantity and type of pending notifications. As the notification area is expanded, the computing device, through the display of the graphical elements in the leading edge region, provides an indication of the quantity and type of pending notifications that are associated with notification messages that have yet to be displayed in the notification area. In this manner, interaction with the notification area may be more efficient, as during a process of expanding or contracting this area, the user is informed the underlying state of the set of pending notifications as a whole. For example, a user may be provided with information indicating whether further expansion of the notification area is required. In some circumstances, the user may be provided with an indication of the type of notifications not yet displayed in the notification area to allow appropriate decision making. Furthermore, animation may be used to demonstrate the logical connection between the graphical elements and the notification area. By reducing interactions necessary to discover information about the system, a reduced load may be placed on the computing device.

By managing notifications and outputting indications of notifications as part of a GUI in this way, an example computing device may improve the usability of the GUI, reduce interaction time between a user and the GUI when interacting with notifications, and promote more efficient user interactions with notifications. Better usability, reduced interaction time, and more efficient user inputs, an example computing device may receive fewer false inputs or fewer inputs in general than other computing devices that do not manage and output notifications in this way. The example computing device may therefore perform fewer operations and may consume less electrical power and/or result in battery power savings. In addition, the example computing device may provide a less frustrating more enjoyable user experience.

In one example, a method is described that includes displaying, by a computing device, in a status bar of a graphical user interface, a set of graphical elements, each graphical element from the set of graphical elements corresponding to a different pending notification from a group of pending notifications; expanding, by the computing device, a notification shade from the status bar; and while expanding the notification shade from the status bar, displaying, by the computing device, the set of graphical elements within an area of the notification shade that is adjacent to a leading edge of the notification shade. The method further includes determining, by the computing device, whether a particular notification message associated with a particular notification from the group of pending notifications is newly visible in the notification shade; and responsive to determining that the particular notification message is newly visible: removing, by the computing device, from the area of the notification shade that is adjacent to the leading edge of the notification shade, a particular graphical element from the set of graphical elements that corresponds to the particular notification; and displaying, by the computing device, the particular graphical element within the particular notification message.

In another example, a computing device is described that includes a display and at least one processor configured to display, at the display, in a status bar of a graphical user interface, a set of graphical elements, each graphical element from the set of graphical elements corresponding to a different pending notification from a group of pending notifications; expand a notification shade from the status bar; and while expanding the notification shade from the status bar, display the set of graphical elements within an area of the notification shade that is adjacent to a leading edge of the notification shade. The at least one processor is further configured to determine whether a particular notification message associated with a particular notification from the group of pending notifications is newly visible in the notification shade; and responsive to determining that the particular notification message is newly visible: remove, from the area of the notification shade that is adjacent to the leading edge of the notification shade, a particular graphical element from the set of graphical elements that corresponds to the particular notification; and display, the particular graphical element within the particular notification message.

In another example, a computer program product and/or computer-readable storage medium is described that includes instructions, that when executed, cause at least one processor of a computing device to display, at the display, in a status bar of a graphical user interface, a set of graphical elements, each graphical element from the set of graphical elements corresponding to a different pending notification from a group of pending notifications; expand a notification shade from the status bar; and while expanding the notification shade from the status bar, display the set of graphical elements within an area of the notification shade that is adjacent to a leading edge of the notification shade. The instructions, when executed, further cause the at least one processor to determine whether a particular notification message associated with a particular notification from the group of pending notifications is newly visible in the notification shade; and responsive to determining that the particular notification message is newly visible: remove, from the area of the notification shade that is adjacent to the leading edge of the notification shade, a particular graphical element from the set of graphical elements that corresponds to the particular notification; and display, the particular graphical element within the particular notification message.

In another example, a system is described that includes means for displaying, in a status bar of a graphical user interface, a set of graphical elements, each graphical element from the set of graphical elements corresponding to a different pending notification from a group of pending notifications; means for expanding a notification shade from the status bar; and while expanding the notification shade from the status bar, means for displaying the set of graphical elements within an area of the notification shade that is adjacent to a leading edge of the notification shade. The system further includes means for determining whether a particular notification message associated with a particular notification from the group of pending notifications is newly visible in the notification shade; and responsive to determining that the particular notification message is newly visible: means for removing, from the area of the notification shade that is adjacent to the leading edge of the notification shade, a particular graphical element from the set of graphical elements that corresponds to the particular notification; and means for displaying the particular graphical element within the particular notification message.

The details of one or more examples are set forth in the accompanying drawings and the description below. Other features, objects, and advantages of the disclosure will be apparent from the description and drawings, and from the claims.

DETAILED DESCRIPTION

Figure 1:
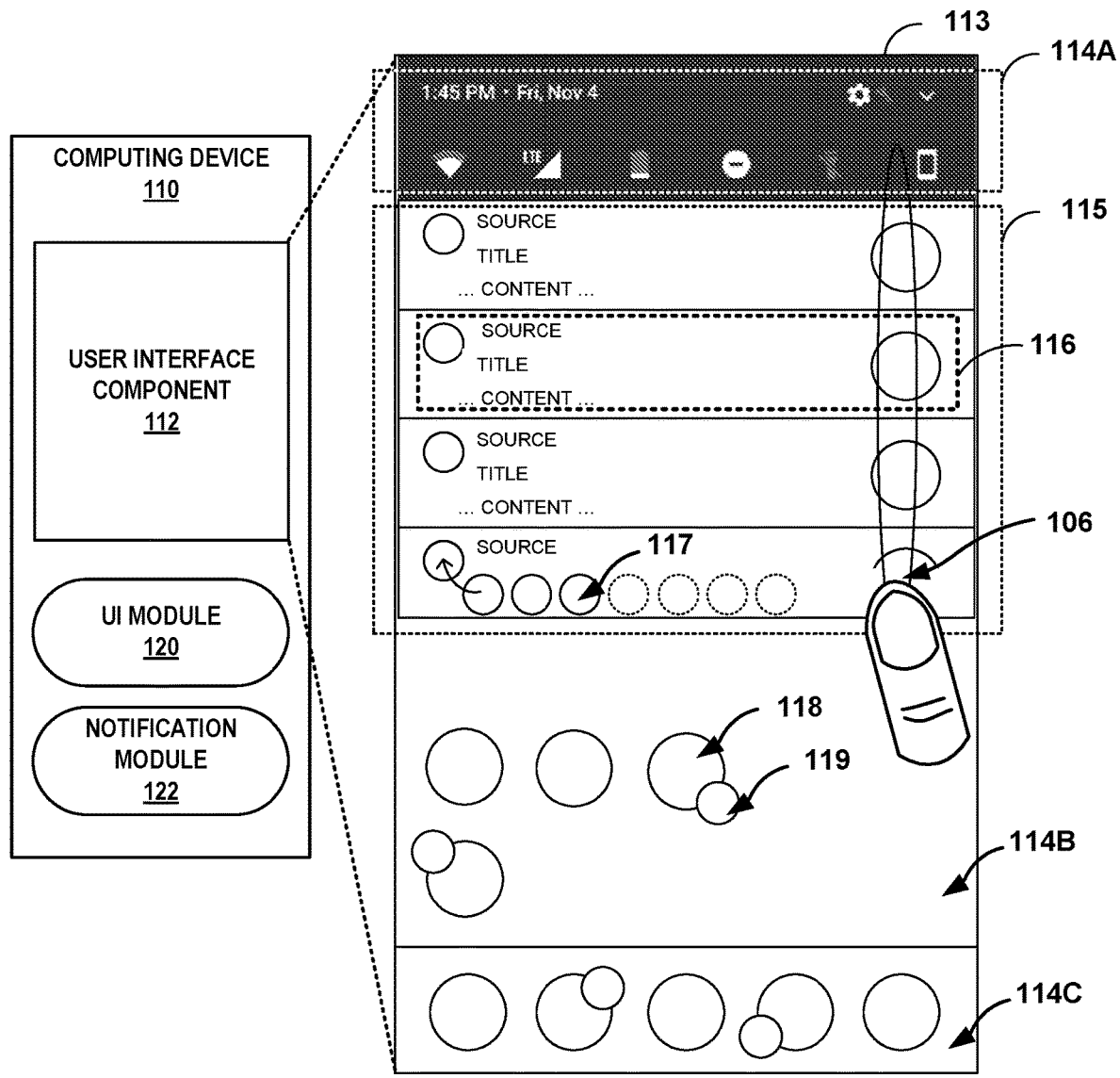
FIG. 1 is a conceptual diagram illustrating an example computing device configured to handle notifications and output indications of notifications as part of a graphical user interface, in accordance with one or more aspects of the present disclosure.

FIG. 1 is a conceptual diagram illustrating an example computing device configured to group notifications and output indications of notifications as part of a graphical user interface, in accordance with one or more aspects of the present disclosure. In the example of FIG. 1, computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to receive, and output an indication (e.g., audible alert, visual alert, haptic alert, voice alert, or other type of indication) of, notification data.

Computing device 110 includes user interface component ("UIC") 112, user interface ("UI") module 120, and notification module 122. Modules 120 and 122 may perform operations described herein using software, hardware, firmware, or a mixture of hardware, software, and firmware residing in and/or executing at computing device 110. Computing device 110 may execute modules 120 and 122 with multiple processors or multiple devices, as virtual machines executing on underlying hardware, as one or more services of an operating system or computing platform, and/or as one or more executable programs at an application layer of a computing platform of computing device 110.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

UIC 112 may detect input (e.g., touch and non-touch input) from a user of computing device 110. UIC 112 may detect indications of input by detecting one or more gestures performed by a user (e.g., the user touching, pointing, and/or swiping at or near one or more locations of UIC 112 with a finger or a stylus pen). UIC 112 may output information to a user in the form of a user interface (e.g., user interface 113), which may be associated with functionality provided by computing device 110.

Notification module 122 may perform functions associated with receiving, managing, and otherwise handling at least a portion of the notification data generated and/or received by platforms, applications, and services executing at, or in communication with, computing device 110. As used throughout the disclosure, the terms "notification" and "notification data" are used to describe various types of information that may indicate the occurrence of an event within an execution environment (e.g., that includes platforms, applications, and services executing at, or in communication with, computing device 110) computing device 110. For example, a notification may include, but is not limited to, information specifying an event such as: the receipt of a communication message (e.g., e-mail, instant message, text message, etc.) by a messaging account associated with computing device 110, the receipt of information by a social networking account associated with computing device 110, a reminder of a calendar event (meetings, appointments, etc.) associated with a calendar account of computer device 110, information generated and/or received by a third-party application executing at or in communication with computing device 110, the transmittal and/or receipt of inter-component communications between two or more components of platforms, applications, and/or services executing at computing device 110, or any other information that may interest a user.

Notification module 122 may process notifications as computing device 110 receives the notifications from any device, server, or service, executing at or in communication with computing device 110 and may distribute portions of the notifications to other modules, applications, and/or services executing at or in communication with computing device 110. For example, notification module 122 may receive notification data from a mobile phone or a computerized watch that is paired via a network connection with computing device 110. The notification data may include information about an event (e.g., a reminder about a movie showing that a user of computing device 110 has purchased tickets to) from a calendar application executing at the mobile phone or computerized watch. In response to receiving the notification data, notification module 122 may send at least a portion of the notification data to UI module 120 along with other information that UI module 120 uses to determine how to cause UIC 112 to display a graphical indication or alert indicative of the notification data.

In some examples, notification module 122 may implement a notification queue for processing notifications. Notification module 122 may place received notification data into the notification queue in a particular order (e.g., first-in-first-out, last-in-first-out, etc.). Notification module 122 may give other applications, services, modules, or platforms executing at computing device 110 access to the notification queue. In this way, notification module 122 need only provide a location in memory to the notification queue and the other applications, services, platforms, or modules executing at computing device 110 can access incoming notification data directly. For example, UI module 120 may receive a pointer from notification client module 122 indicating the location of notification queue in a memory of computing device 110. UI module 120 may retrieve and analyze the notification data in the notification queue to create various aspects of user interface 113.

Notification module 122 may categorize notifications and rank notifications in a ranked order of categorical-importance. For example, notification module 122 may analyze metadata of a notification indicating one or more of: a title, content, a photo, an avatar, a notification icon, a notification source (e.g., the application or service that generated the notification), a sender, a time of receipt, a time of expiration, a priority level, a type, and the like. Notification module 122 may input at least a portion of metadata of a notification into a model (e.g., rules-based, machine-learning, or other type of model) for categorizing the notification as being either: an important and ongoing type notification (e.g., media, a telephone or video call in progress, navigation instructions, screen sharing, timers, alarms, meeting reminders, etc.), a person-to-person type notification (e.g., a text message, e-mail message, chat message, missed telephone or video call, voicemail, etc.), a "by-the-way" type notification (e.g., a promotion, a content suggestion, etc.), a system informational notification (e.g., network connection status, battery status, peripheral connection status, an indication of whether an application is executing in the background, a message received from an integrated messaging platform configured to display and enable interactions with incoming messages regardless of the application that is currently executing in the foreground of user interface 113, or other system alert), or a regular type notification (e.g., anything other type of notification that does not fit into one of the other categories mentioned previously).

In cases where notification module 122 or any other part of computing device 110 stores or makes use of personal information associated with the user of computing device 110, notification module 122 or any other part of computing device 110 may only store or make use of the personal information after receiving explicit consent from the user to do so (e.g., by a menu setting, or obtaining consent in other form). Computing device 110 may encrypt or otherwise treat any personal information being analyzed and/or stored to remove the actual identity of the user before storing or making use of the personal. For example, the information may be treated by notification module 122 so that any personally-identifiable information is removed when received from a notification source and stored for later processing.

Some notification sources may generate notifications for a variety of reasons. To enable a notification source to define its own classification, prioritization, and settings for its different types of notifications, notification module 122 may enable a notification source to to define one or more "channels" associated with the notification source. Each channel is unique to the notification source and may have a respective label, alert setting(s) (e.g., sound, vibration, banner, etc.), prioritization level, channel graphic, and other parameters. Upon generating a notification, the notification source may assign that notification to a particular one of its channels. Notification module 122 may handle the notification according to the parameters associated with its channel.

Notification module 122 may enable user control and customization over some or all notification parameters (e.g., prioritization, alert settings, and the like) for notifications according to the notification's source. Notification module 122 may further enable user control and customization over some or all notification parameters for notifications according to the notification's channel.

In general, UI module 120 may manage the interactions with, and control the display of, user interfaces (e.g., user interface 113) being presented at UIC 112. For example, UI module 120 may receive information (e.g., notification data) and/or instructions from various sources (e.g., one or more system platforms, operating systems, applications, modules, and/or services executing at or in communication with computing device 110) for generating user interface 113 and elements thereof. In response, UI module 120 may output instructions and information to UIC 112 to cause UIC 112 to display user interface 113. In addition, UI module 120 may receive information from UIC 112 in response to inputs detected by UIC 112 at locations at which elements of user interface 113 are displayed; and disseminate information about the inputs to various destinations (e.g., one or more system platforms, operating systems, applications, modules, and/or services executing at or in communication with computing device 110) for interpreting the inputs and for causing computing device 110 to perform one or more functions. In some examples, UI module 120 may receive explicit instructions from a source for generating a user interface that is displayed by UIC 112. However, in other cases, UI module 120 may receive other information (e.g., notification data) and automatically generate a user interface that is displayed by UIC 112 based on the other information. UI module 120 may automatically generate, from notification data obtained by notification module 122, elements of user interface 113.

User interface 113 represents a graphical user interface from which a user of computing device 110 can interact with computing device 110, for example, to launch applications executing at or access services accessible to computing device 110, adjust settings associated with computing device 110, or to view graphical indications of notification generated by computing device 110 and/or the applications executing at, or services accessible to, computing device 110. User interface 113 includes status bar 114A, application screen 114B, favorites region 114C, and notification area 115. User interface 113 of FIG. 1 is only one example of a graphical user interface, and many other examples of user interface 113 exist that include additional or fewer features than those shown in FIG. 1.

Status bar 114A (also sometimes referred to as "an energy bar") is a graphical element of user interface 113 that includes time and date information, as well as status icons and other icons from which a user can observe the current state of various system level features of computing device 110. For example, status bar 114A includes various network connectivity icons, a battery level icon, and the like.

Application screen 114B is a page or screen of user interface 113 from which a user can launch or otherwise interact with the applications executing at, or services accessible to, computing device 110. Application screen 114B may be a home screen that included widgets, launch icons, a background image, or other features. Application screen 114B may include multiple pages or screens. Application screen 114B may be any type of user interface screen associated with an application or service that is executing at computing device 110. In the example of FIG. 1, application screen 114B is a home screen of the operating platform of computing device 110 and includes various launch icons, such as launch icon 118, that if selected (e.g., in response to user input being detected by UIC 112 at a location of UIC 112 at which a particular launch icon is displayed) may cause computing device 110 to execute a particular application or service associated with that particular launch icon.

Favorites region 114C is another region of user interface 113 from which a user can launch the applications executing at, or services accessible to, computing device 110. Favorites region 114C may include a subset of the launch icons that are accessible from application screen 114B of FIG. 1. Favorites region 114C may be customizable by a user and may include one or more launch icons of the most frequently accessed applications executing at, or services accessible to, computing device 110.

Whether a launch icon is displayed on application screen 114B or in favorites region 114C, the launch icon may include a notification badge, such as notification badge 119. Badge icons 119, while shown at different locations that partially overlap application icon 118, may all be positioned in the same relative location with respect to each application icon 118. Notification module 122 may receive a notification generated by an application executing at, or a service accessible to, computing device 110 and after processing the notification, send notification data and other information to UI module 120 that causes UI module 120 to display at UIC 112, a graphical indication of the notification as a notification badge displayed adjacent to, or as part of, a launch icon of an application or service that generated the notification. For example, notification module 122 may receive a notification generated by the application or service associated with launch icon 118 and cause UI module 120 to update the display of user interface 113 at UIC 112 so as to include notification badge 119 adjacent to launch icon 118 to alert a user of computing device 110 to the notification generated by the application or service associated with launch icon 118.

Notification area 115 is a region of user interface 113 that is configured to display graphical indications of notifications as notification messages, such as notification message 116, and notification graphical elements (e.g., channel graphics, notification icons, badge icons, or other graphics or images), such as notification icon 117. Notification area 115 may be a solid, opaque, or semi-opaque notification pane, notification window, or notification shade that shows notification messages and/or notification graphical elements for each notification received by notification module 122 that has not yet been viewed, read, heard, or otherwise cleared. For example, if notification module 122 receives a notification, notification module 122 and UI module 120 may cause notification area 115 to include notification message 116 which may include one or more graphical elements (e.g., icons, actionable elements, avatars, etc.), text (e.g., a notification source, a title, content, or other information), and/or other contents displayed within the message preview.

A user may interact with a particular notification message from notification area 115 by providing input at or near a location at which the notification message is displayed by UIC 112. For example, UI module 120 may cause notification message 116 to appear to expand from a collapsed to expanded state when displayed by UIC 112 to show a greater amount of information in response to UIC 112 detecting a gesture input at or near a location of UIC 112 at which the notification message 116 is displayed.

In the example of FIG. 1, notification area 115 is a notification shade that appears collapsed behind status bar 114A when notification area 115 is hidden from view and appears to expand in-front-of application screen 114B when pulled and expanded into view. For example, in response to detecting user input 106 (shown in FIG. 1 as a drag down gesture being performed by a stylus or finger at or near a location of UIC 112 at which user interface 113 is displayed), UI module 120 may cause the display of notification area 115 at UIC 112 to appear to unfurl from behind status bar 114A and increase in size in an amount that is proportionate to the length of user input 106. As UI module 120 causes notification area 115 to appear to expand while being displayed by UIC 112, the notification messages contained within notification area 115 may become visible from behind status bar 114A.

In some examples, when UI module 120 causes notification area 115 to appear hidden, or collapsed, behind status bar 114A, UI module 120 may cause UIC 112 to include a notification graphical element, such as notification graphical element 117, within status bar 114A for each pending notification received by notification module 122. As UI module 120 causes notification area 115A to appear to expand from beneath status bar 114A, UI module 120 may cause UIC 112 to animate the notification graphical elements previously displayed within status bar 114A by causing the notification graphical elements to move with the leading edge of notification area 115 as notification area 115 comes into view from behind status bar 114A. As each notification message within notification area 115 comes into view at UIC 112, UI module 120 may cause UIC 112 to display the notification graphical element, such as graphical element 117, that is displayed within the leading edge region of notification area 115 and corresponds to that notification message, to be displayed as animating from the leading edge region of notification area 115 and into the notification message. In this way, when notification area 115 is collapsed, UI module 120 causes UIC 112 to display notification graphical elements in status bar region 114A as an indication of the quantity and type of pending notifications. As notification area 115 is expanded, UI module 120, through the display of the notification graphical elements, such as element 117, in the leading edge region of notification area 115, provides an indication of the quantity and type of pending notifications that are associated with notification messages that have yet to be displayed (or are still collapsed behind status bar 114A) in notification area 115.

Figure 2:
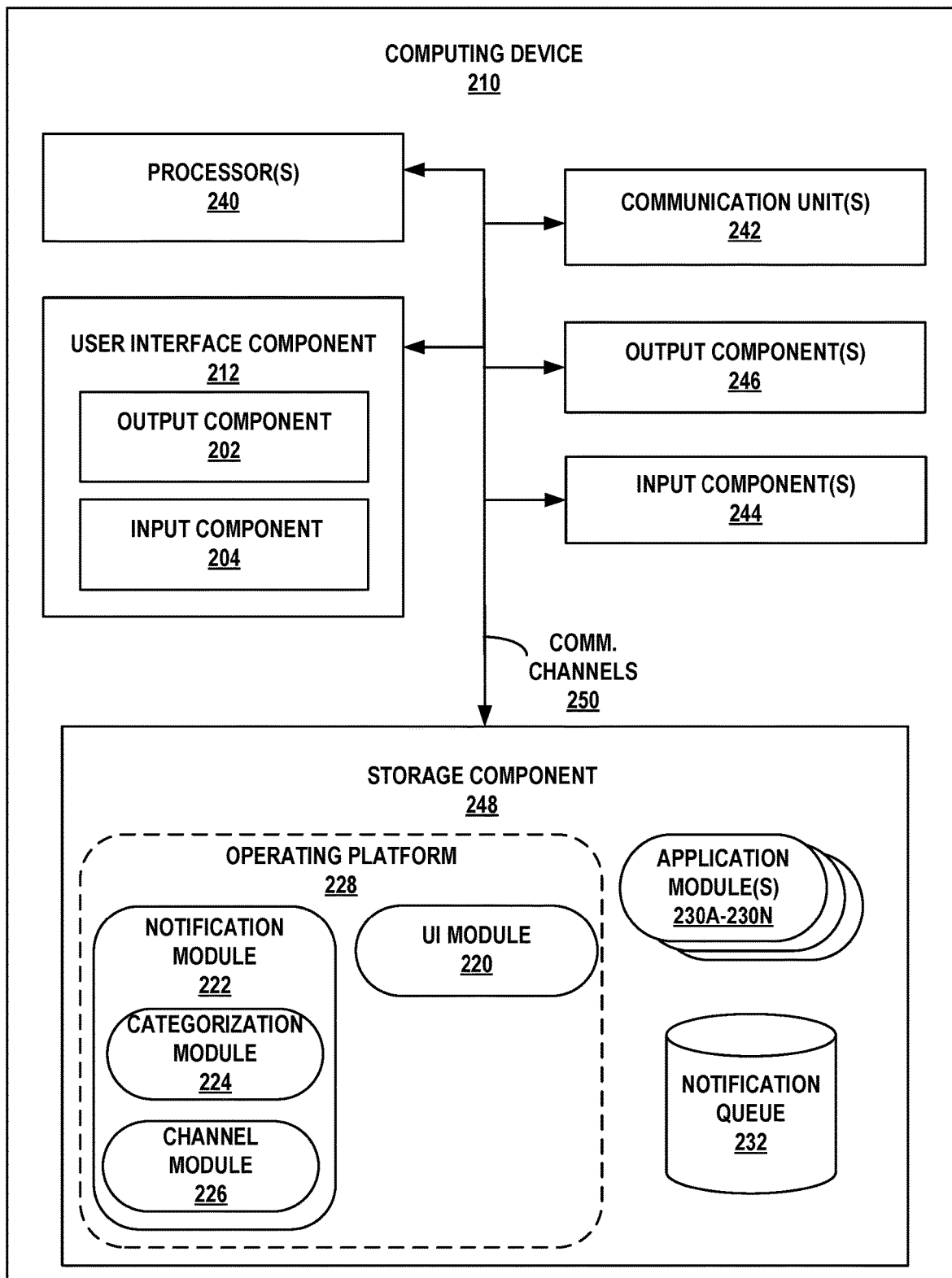
FIG. 2 is a block diagram illustrating an example computing device that is configured to handle notifications and output indications of notifications as part of a graphical user interface, in accordance with one or more aspects of the present disclosure.

FIG. 2 is a block diagram illustrating an example computing device that is configured to handle notifications and output indications of notifications as part of a graphical user interface, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 includes notification queue 232, application modules 230A-230N (collectively "application modules 230") and operating platform 228 which includes notification module 222 and UI module 120. Notification module 222 includes categorization module 224 and channel module 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component, such as a touch of capacitive sensor, that detects an object at and/or near output component 202. Output component 202 and input component 204 may be a speaker and microphone pair or any other combination of one or more input and output components, such as input components 244 and output components 244. In the example of FIG. 2, UIC 212 may present a user interface (such as user interface 113 of FIG. 1).

As one example range, presence-sensitive input component 204 may detect an object, such as one or more fingers, a stylus, or one or more other inputs units that are within two inches or less of output component 202. Input component 204 may determine a location (e.g., an [x, y] coordinate) of output component 202 at which the object was detected. In another example range, input component 204 may detect an object six inches or less from output component 202 and other ranges are also possible. Input component 204 may determine the location of output component 202 selected by a user's finger using capacitive, inductive, and/or optical recognition techniques. In some examples, input component 204 also provides output to a user using tactile, audible, or visual stimuli as described with respect to output component 202.

UIC 212 of computing device 210 may detect two-dimensional and/or three-dimensional gestures as input from a user of computing device 210. For instance, a sensor of UIC 212 may detect a user's movement (e.g., moving one or more hands, arms, fingers, other body parts, pens, styluses, etc.) within a threshold distance of the sensor of UIC 212. UIC 212 may determine a two- or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store notification queue 232 as well as data accessed by modules 220, 222, 224, 226, and 230 and operating platform 228 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with notification queue 232, modules 220, 222, 224, 226, and 230, and operating platform 228. Storage components 248 may include a memory configured to store data or other information associated with notification queue 232, modules 220, 222, 224, 226, and 230, and operating platform 228.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, and 230, and operating platform 228 may be operable by processors 240 to perform various actions, operations, or functions of computing device 210. For example, processors 240 of computing device 210 may retrieve and execute instructions stored by storage components 248 that cause processors 240 to perform the operations described herein that are attributed to modules 220, 222, 224, 226, and 230, and operating platform 228. The instructions, when executed by processors 240, may cause computing device 210 to store information within storage components 248, for example, at notification queue 232.

Application modules 230 represent any source of notifications executing at computing device 210 or accessible from computing device 210. For example, application modules 230 may include messaging applications, social media applications, calendar applications, gaming applications, digital assistant applications, keyboard application, application extension, or any other type of applications configured to execute at computing device 210. Application modules 230 may be cloud-based applications that are accessible from computing device 210 but execute at a remote server in a cloud network environment. Application modules 230 may generate notification data received by notification module 222 and stored as notifications at notification queue 233.

Notification queue 232 represents any suitable storage medium for storing and buffering notification data. For instance, notification queue 232 may be a queue, stack, or type of data structure for buffering for organizing notification data as notification module 222 receives the notification data, over time. UI module 220 may access notification queue 232 and generate elements of a user interface, such as user interface 113, based on the notification data stored at notification queue 232. Notification module 222 may perform read/write operations for adding information to notification queue 232 (e.g., when notification data is received) or removing information from notification queue 232 (e.g., when a user provided input to dismiss a notification alert, etc.).

Operating platform 228 manages computing resources of computing device 212. Also referred to as an operating system, operating platform 228 manages the interaction between modules 220, 222, 224, 226, and 230, notification queue 232, and components 202, 204, 212, 240, 242, 244, 246, and 248. For example, operating platform 228 may perform time-sharing or scheduling of tasks to ensure that each of modules 220, 222, 224, 226, and 230 are allocated a percentage of processor time of processors 240 or may efficiently access the information stored at storage component 248, or any other of components 202, 204, 212, 242, 244, and 246. In other words, operating platform 228 may act as an intermediary between software, hardware, and firmware, executing at or accessible to computing device 210. In some examples, operating platform 228 is the only executable application of computing device 210 that generates, receives, manages, or otherwise handles notification data and the presentation thereof. For example, rather than rely on multiple, application specific programs or applications, operating platform 228 of computing device 210, using UI module 220 and notification module 222, may control all operations and functions related to notifications and the presentation of information associated with notification data at UIC 212.

Notification module 222 may include all functionality of notification module 122 of computing device 110 of FIG. 1 and may perform similar operations as notification module 222 for receiving, managing, and otherwise handling at least a portion of the notification data generated and/or received by platforms, applications, and services executing at, or in communication with, computing device 210. As shown in FIG. 2, notification module 222 may be part of or associated with operating platform 228. For example, notification module 222 may be a sub-module, service, or activity of operating platform 228 as opposed to a separate module or application of computing device 210.

Notification module 222 may receive notification data (e.g., as information obtained by communication units 242 from a different computing device, as information obtained from one of application modules 230, etc.) and store the notification data at notification queue 232. Notification module 222 may output portions of the notification data it receives to UI module 220 and/or provide access to UI module 220 to notification queue 232. For example, notification module 222 may share with UI module 220, a memory pointer to a location of notification queue 232 within storage component 248 and allow UI module 220 to access the data stored at the location (e.g., to automatically generate graphical elements that UI module 220 causes UIC 212 to display as user interface 113).

Categorization module 224 of notification module 222 may categorize notifications and rank notifications in a ranked order of categorical-importance. For example, notification module 222 may analyze notification data to determine a title, content, an avatar, a notification icon, a notification source (e.g., the application or service that generated the notification), a sender, a time of receipt, a time of expiration, a priority level, a type, and other information about the notification.

Categorization module 224 may execute a rules-based, machine-learning, or other type of model for categorizing notification data into one of several different categories of importance. The model may be any type of machine-learning or artificial intelligence based model that is trained (e.g., based on heuristics and/or past user interaction data associated with computing device 210 and other computing devices) to categorize a notification. The model may use heuristics to determine the importance and category of a notification. For example, the notification source may be a factor that categorization module 224 uses to gauge a notification's importance of category (e.g., navigational application notifications may be treated more important than application update or new feature notifications). Whether an application source is running as a foreground process may be a factor for determining a notification's importance. That is, foreground running application modules 230 may rate higher or more important than application modules 230 that are executing as background processes.

Categorization module 224 may determine that the most important, or highest ranking category of importance for a notification is an "important and ongoing" type notification that is typically time sensitive or applicable to a user's current context (e.g., location, time of day, a user's current task, etc.). Examples of "important and ongoing" type notifications include: notifications about media (e.g., games, videos, music, etc.) currently being output by computing device 210, a telephone or video calls currently in progress via computing device 210, navigation instructions currently being output by computing device 210, screen sharing functions of computing device 210, timers or alarms set through computing device 210, calendar or meeting reminders output by computing device 210, etc.

Categorization module 224 may determine that the second most important, or next-highest ranking category of importance for a notification is a "person-to-person" type notification that involves some form of back-and-forth messaging communication between two people or groups of people, other than telephone or video calling. For example, categorization module 224 may determine that notifications relating to text messages, e-mail messages, chat messages, missed telephone or video calls, voicemails, and the like, are all types of person-to-person type notifications.

Categorization module 224 may determine that the second least important, or next-lowest ranking category of importance for a notification is a "by-the-way" type notification that is informational, but not necessarily related to any ongoing communication or current task. For example, categorization module 224 may determine that notifications relating to promotions, advertisements, and content suggestions are all types of by-the-way type notifications.

Categorization module 224 may determine that the second least important, or next-lowest ranking category of importance for a notification is a system informational notification. Examples of system informational notifications include information about software updates (e.g., operating system updates, application updates, etc.), network connection status, battery status, peripheral connection status, currently executing application statuses, messages received from integrated messaging platform configured to display and enable interactions with incoming messages regardless of the application that is currently executing in the foreground of user interface 113, and other system alert.

Categorization module 224 may determine that the middle-ranked category of importance for a notification is a "regular" type notification. Categorization module 224 may determine that any notification that is not either an important and ongoing type notification, a person-to-person type notification, a by-the-way type notification, or a system informational notification, is a regular type notification that should neither be ranked high or low relative to the other types of notifications.

Some notification sources may generate notifications for a variety of reasons. To enable a notification source to define its own classification, prioritization, and settings for its different types of notifications, channel module 226 of notification module 222 may enable any of application modules 230 to define one or more "channels" associated with the that application module 230. Each channel may be unique to a particular application module 230 and may have a respective label, alert setting(s) (e.g., sound, vibration, banner, etc.), prioritization level, channel graphic, and/or other parameter. Upon generating a notification, the one of application modules 230 that generated the notification (e.g., application module 230A) may assign the notification to a particular one of the channels associated with application module 230A. Channel module 226 may interpret the channel parameters and cause notification module 222 to handle the notification according to the parameters associated with the channel for application module 230A.

While notification module 222 may enable user control and customization over some or all notification parameters (e.g., prioritization, alert settings, and the like) for notifications according to the notification's source, channel module 226 may further enable user control and customization over some or all notification parameters for notifications according to the notification's channel. For example, channel module 226 may manage user inputs detected at a settings page of a user interface, such as user interface 113, to determine values associated with a channel's parameters.

In cases where notification module 222 or any other part of computing device 210 stores or makes use of personal information (e.g., notification information, communications, contacts, contextual information, etc.) associated with the user of computing device 210, notification module 222 or any other part of computing device 210 may only store or make use of the personal information after receiving explicit consent from the user to do so (e.g., by a menu setting, or obtaining consent in other form). Computing device 210 may encrypt or otherwise treat any personal information being analyzed and/or stored to remove the actual identity of the user before storing or making use of the personal. For example, the information may be treated by notification module 222 so that any personally-identifiable information is removed when received from a notification source and stored for later processing.

Channel module 226 of notification module 222 may provide an application programming interface (API) from which any of application modules 230 may define one or more respective notification channels that are particular to that application or notification source. That is, channel module 226 may provide a mechanism (e.g., an API) by which developers of one of application modules 230 may provide an indication of the various types of notifications that may be generated by that application module 230. Channel module 226 may enable an application module 230 to define a channel during compilation or dynamically (e.g., at run-time).

For example, a social media application may generate promotional notifications (e.g., to alert a user to a new feature of the social media service), profile update notifications, incoming message notifications, relationship request notifications, or various other types of notifications associated with the social media service. The social media application may define a channel via the API provided by channel module 226 for each type of notification it generates thereby enabling user control over the classification, categorization, prioritization, and settings for each different type of social media notifications.

UI module 220 may include all functionality of UI module 120 of computing device 110 of FIG. 1 and may perform similar operations as UI module 120 for managing a user interface (e.g., user interface 113) that computing device 210 provides at UIC 212 for handling input from, and output to, a user. For example, UI module 220 may generate instructions or commands, based on notification data and other information obtained by notification module 222, to cause UIC 212 to display user interface 113 and the elements thereof. As is the case with notification module 222, UI module 220 may be part of or associated with operating platform 228. For example, UI module 220 may be a sub-module, service, or activity of operating platform 228 as opposed to a separate module or application of computing device 210.

UI module 220 may analyze notification data upon its receipt and storage at notification queue 232 and update (in response to receiving commands from notification module 222), elements of user interface 113 such that UIC 212 displays graphical indications of the notifications (e.g., as notification badges, notification messages, or other types of graphical indications) soon after the notifications are generated and/or received.

Figure 3A:
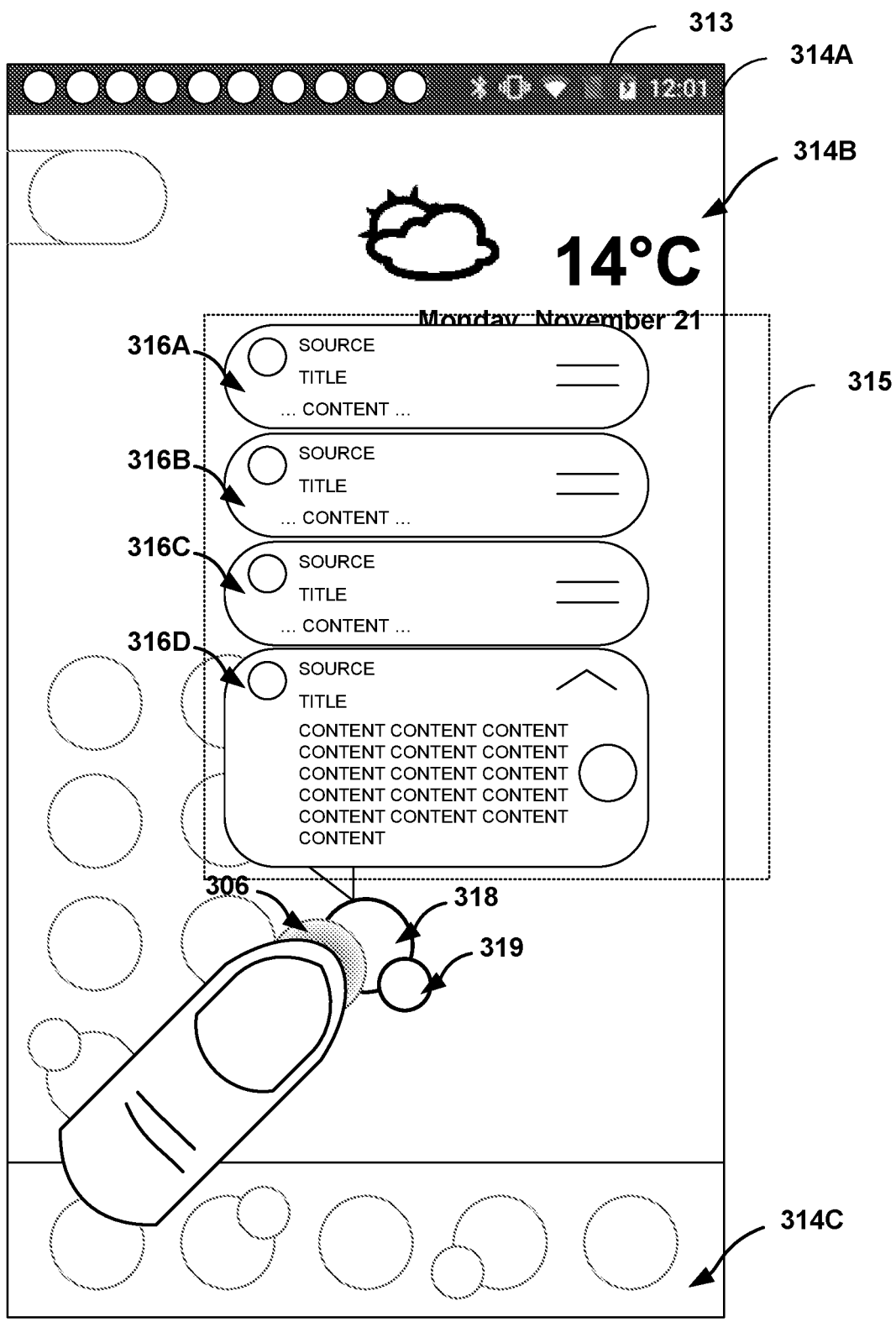
FIG. 3A is a conceptual diagram illustrating an example graphical user interface presented by an example computing device that is configured to display notification badges and notification previews, in accordance with one or more aspects of the present disclosure.

FIG. 3A is a conceptual diagram illustrating an example graphical user interface presented by an example computing device that is configured to display notification badges and notification previews, in accordance with one or more aspects of the present disclosure. FIG. 3A is described below in the context of computing device 210 of FIG. 2.

FIG. 3A illustrates user interface 313 as an example user interface that may be displayed by computing device 210. UI module 220 and notification module 222 of computing device 210 may cause UIC 212 to output user interface 313 for display. User interface 313 includes status bar 314A, application screen 314B, and favorites region 314C. Displayed within application screen 314B, user interface 313 includes launch icon 318 which represents a graphical element associated with a notification source. Displayed at or near launch icon 318 is notification badge 319. Although shown in the example of FIG. 3A as being displayed within application screen 314B, launch icon 318 and notification badge 319 may be displayed in favorites region 314C or some other portion of user interface 313.

A user may provide a first type of user input (e.g. a tap gesture) at or near a location of UIC 212 at which launch icon 318 is displayed. UI module 220 may interpret the first type of user input as an input that selects launch icon 318 to cause computing device 210 to execute the application or service associated with launch icon 318. The user may provide a second type of user input 306 (e.g. a long-press gesture) at or near a location of UIC 212 at which launch icon 318 is displayed. UI module 220 may interpret the second type of user input 306 as an input that selects launch icon 318 to cause computing device 210 to display notification area 315, which in the example of FIG. 3A, is a notification preview window that includes notification messages 316A-316D (collectively "notification messages 316"). Each of notification messages 316 corresponds to a different pending notification that notification module 222 received from the notification source associated with launch icon 318.

From notification area 315, a user of computing device 220 may interact with notification messages 316 the same way that he or she would interact with them if they were being displayed in a notification shade, such as notification area 115 of FIG. 1. For example, a user may provide gesture input at or near a location of UIC 212 at which notification message 316D is being displayed to cause notification message 316D to expand and show more content than notification messages 316A-316C which are shown in collapsed view. Computing device 210 may enable in-line actions from notification area 315. Computing device 210 may interpret inputs detected at notification area 315 as corresponding to user commands to cause computing device 210 to perform an action on a notification that corresponds to any of notification messages 316. In some examples, computing device 210 may, in response to detecting one or more inputs, clear the corresponding notification, reply to the corresponding notification (e.g., if the notification is a message notification), mark or save the corresponding notification so that the notification remains pending, forward the notification, block the notification, adjust settings of the notification, or any other action that may be performed on a notification from a notification area or notification shade.

In some examples, notification badge 319 may animate into notification area 315. That is, UI module 220 may cause notification area 315 to appear to grow or expand from notification badge 319 in response to detecting a long-press gesture at or near a location at which launch icon 318 is displayed. For example, notification area 315 may appear to grow out of launch icon 318 to show notification messages 316 in response to a long-press.

Figure 3B:
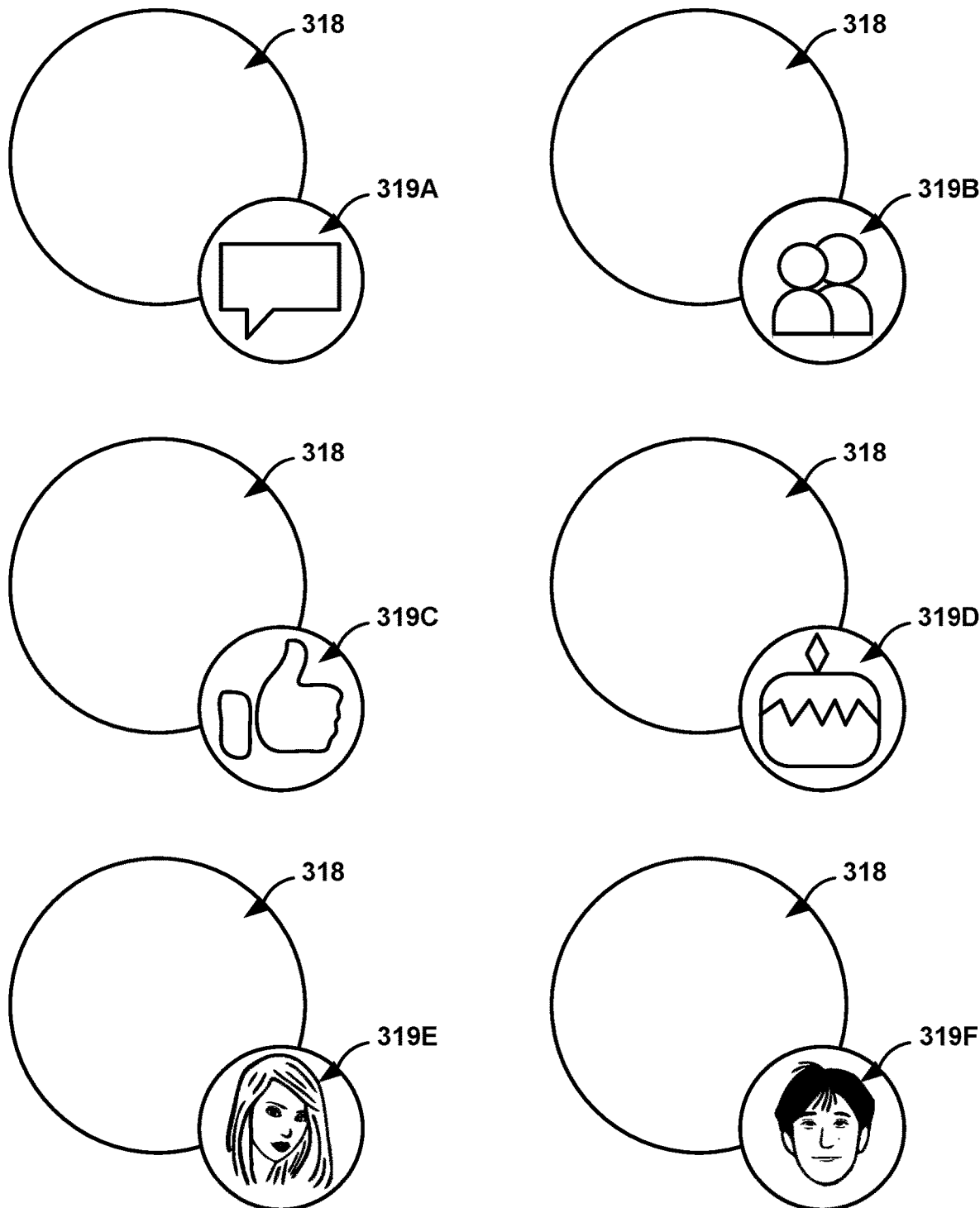
FIG. 3B is a conceptual diagram illustrating example notification badges from the example graphical user interface of FIG. 3A, in accordance with one or more aspects of the present disclosure.

FIG. 3B is a conceptual diagram illustrating example notification badges from the example graphical user interface of FIG. 3A, in accordance with one or more aspects of the present disclosure. FIG. 3A is described below in the context of computing device 210 of FIG. 2.

FIG. 3B includes notification badges 319A-319F as example notification badges displayed adjacent to, or as part of, launch icon 318. However, unlike a typical notification badge that may be displayed by other computing devices, that merely indicate a total quantity of notifications currently pending for the application or service that is associated with the launch icon, notification badges 319-319F include information (e.g., graphical information, text, images, graphics, icons, avatars, etc.) that reflect the content of the pending notifications for which the notification badges represent, the category that the notification is assigned to, and/or the channel that the notification is associated with.

For example, notification badge 319A includes a messaging icon to indicate that the pending notification(s) associated with launch icon 318 are associated with a new message channel of the application or service that generated the pending notification(s). Notification badge 319B includes a person icon to indicate that the pending notification(s) associated with launch icon 318 are person-to-person type notifications (e.g., as categorized by notification module 222). Notification badge 319C includes a "like" icon to indicate that the pending notification(s) associated with launch icon 318 are positive feedback notifications. Notification badge 319D includes a birthday cake icon to indicate that the pending notification(s) associated with launch icon 318 are associated with an important and ongoing event reminder notification (e.g., for a friend or family member's birthday). Notification badges 319E and 319F include graphical elements associated with persons or users to indicate that the pending notification(s) associated with launch icon 318 are associated with a a particular person or user (e.g., from an address book of computing device 210) that is a sender of a communication (e.g., e-mail, chat message, instant message, text message, video message, voicemail, or any other type of communication from a sender). For example, badges 319E and 319F may be photos, avatars, or other graphical elements (e.g., images, graphics, stickers, emoji, etc.) indicative of a person or user associated with a pending notification.

As shown in FIG. 3B, even though launch icon 318 is associated with a single application or service, computing device 210 may cause launch icon 318 to have a different types of notification badge, such as notification badges 319A-319D, that reflects the content, category, or channel of the pending notification(s). Displaying notification badges that reflect the content of pending notifications may minimize anxiety and/or confusion some users may have from seeing other types of notification badges.

Figure 4:
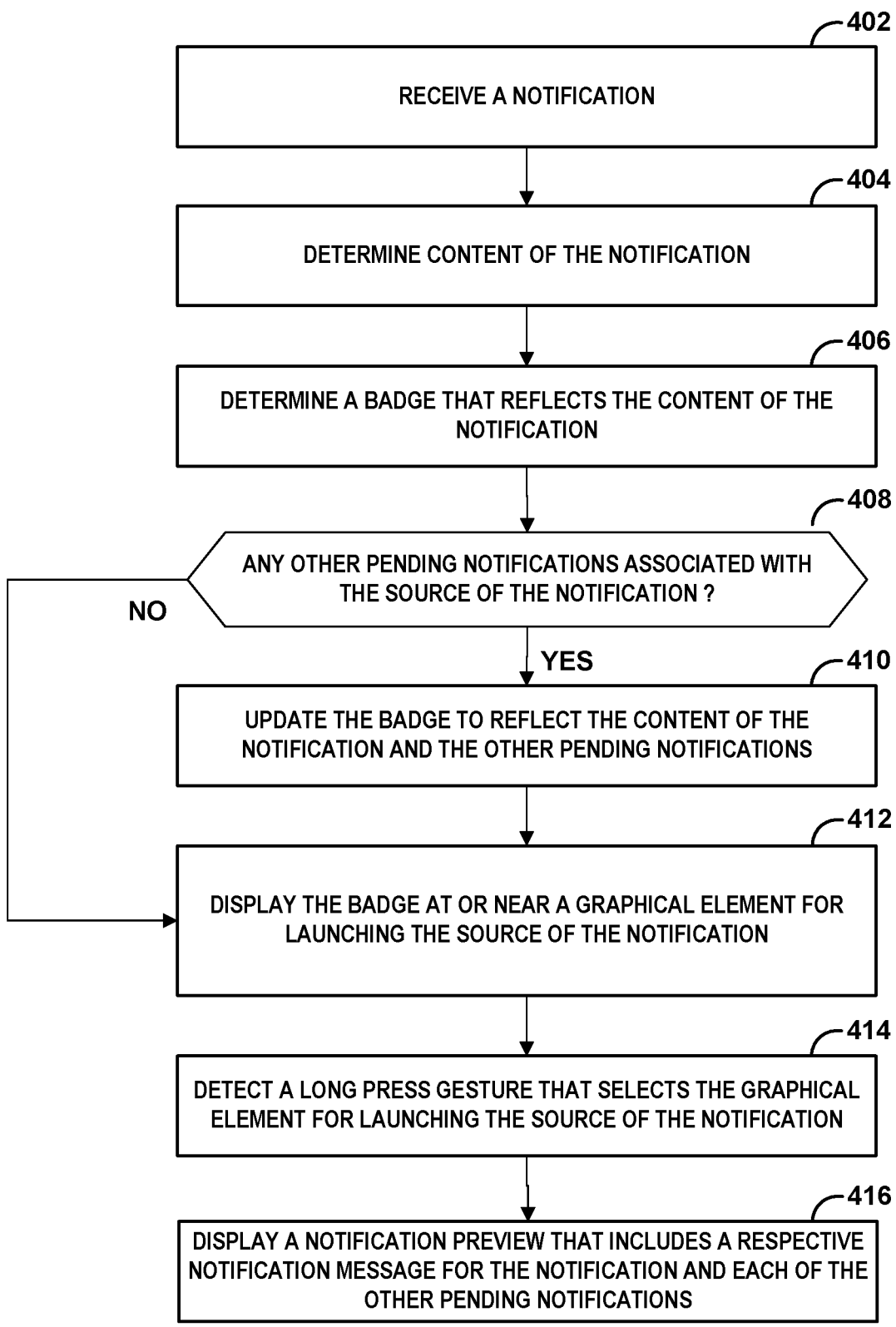
FIG. 4 is a flowchart illustrating example operations performed by an example computing device that is configured to display notification badges and notification previews, in accordance with one or more aspects of the present disclosure.

FIG. 4 is a flowchart illustrating example operations performed by an example computing device that is configured to display notification badges and notification previews, in accordance with one or more aspects of the present disclosure. FIG. 4 is described below in the context of computing device 210 of FIG. 2.

Computing device 210 may receive a notification (402). Computing device 210 may determine content of the notification (404). For example, notification module 222 may receive a notification from application 230A and store the notification at notification queue 233.

Computing device 210 may determine a badge that reflects the content of the notification (406). For example, categorization module 224 may determine that the notification is message from a family member about a birthday party and in response, categorize the notification as a person-to-person type notification and notification module 222 may assign the notification with a notification badge that looks like notification badge 319B of FIG. 3B.

Computing device 210 may determine whether any other pending notifications are associated with the source of the notification (408). If no other notifications associated with the source of the notification are currently pending (408, "NO" branch), then computing device 210 may display the badge at or near a graphical element for launching the source of the notification (412). If, however, other notifications associated with the source of the notification are currently pending (408, "YES" branch), then computing device 210 may update the badge to reflect the content of the notification and the other notifications that are currently pending (410).

For example, notification module 222 may search notification queue 232 for other notifications associated with application module 230A. In response to identifying a second pending notification associated with application module 230A, notification module 222 may determine a notification badge that reflects the content of both pending notifications. The second notification may be an event reminder or calendar appointment for the birthday party referred to in the message from the family member. Notification module 222 may determine that both notifications are related to parties or birthdays and therefore assign the notifications with a notification badge that looks like notification badge 319D of FIG. 3B. In the case that two or more notifications are unrelated, notification module 222 may determine a notification badge that is generic to the notification source and/or the different notificaitons. For example, if notifications are associated with two unrelated messages, notification module 222 may determine the notification badge to be a generic message badge, rather than a message related to just one or both of the notifications.

Computing device 210 may display the badge at or near a graphical element for launching the source of the notification (412). For example, notification module 222 may send instructions to UI module 220 that cause UI module 220 to display notification badge 319D within user interface 313 at or near a location of UIC 212 at which launch icon 318 is displayed.

Computing device 210 may detect a long press gesture that selects the graphical element for launching the source of the notification (414). For example, UI module 220 may receive information from UIC 212 that indicates long-press gesture 306 is being detected at the location of UIC 212 at which launch icon 318 is displayed.

Computing device 210 may display a notification preview that includes a respective notification message for the notification and each of the other pending notifications (416). For example, rather than launching the application or service associated with launch icon 318 in response to gesture 306 (e.g., as UI module 220 may do if gesture 306 were a short-press gesture), UI module 220 may cause UIC 212 to display notification area 315 including notification messages 316A and 316B that correspond to the two pending notifications generated by application module 230A.

Figure 5:
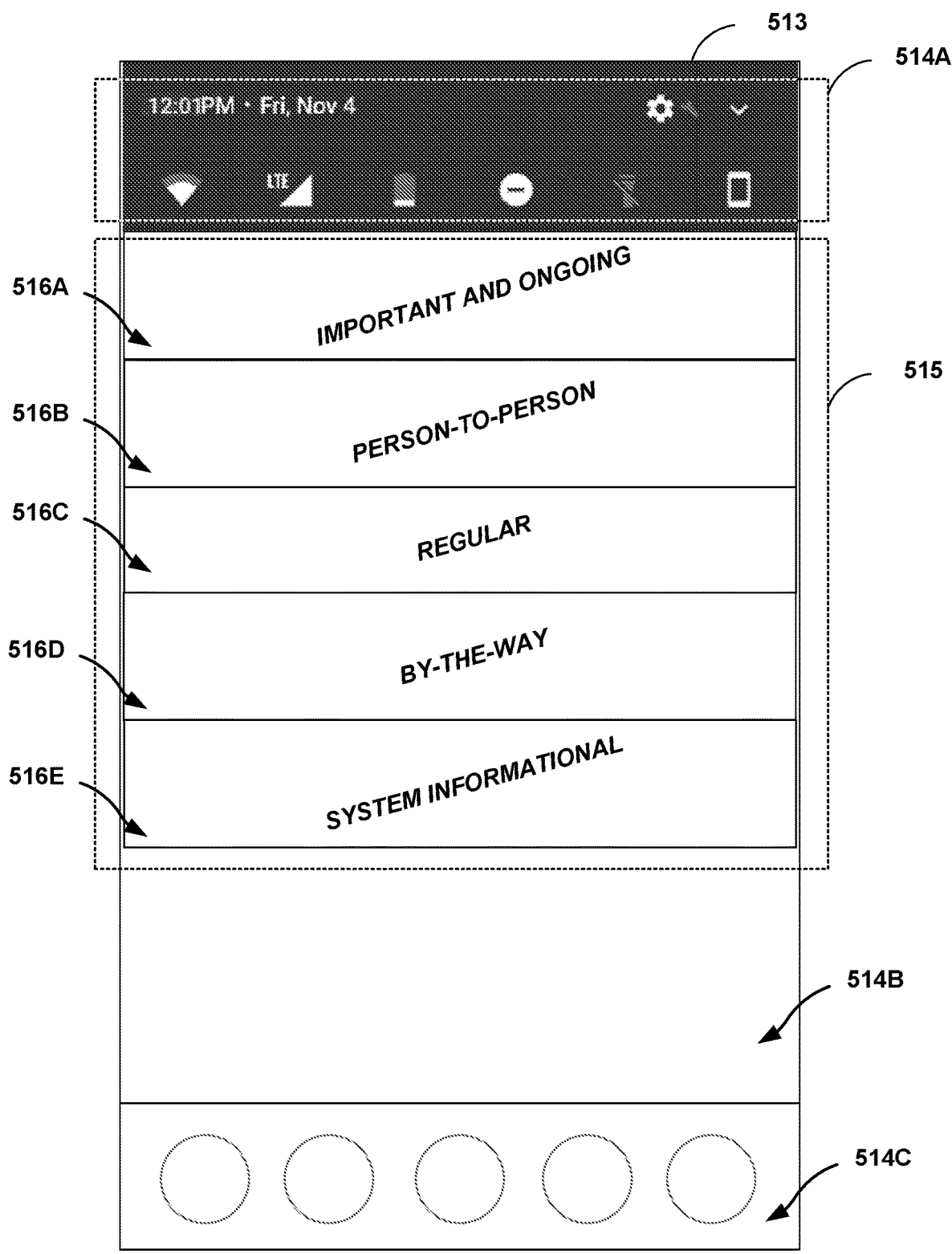
FIG. 5 is a conceptual diagram illustrating an example graphical user interface presented by an example computing device that is configured to categorize and display notification messages according to a categorical order, in accordance with one or more aspects of the present disclosure.

FIG. 5 is a conceptual diagram illustrating an example graphical user interface presented by an example computing device that is configured to categorize and display notification messages according to a categorical order, in accordance with one or more aspects of the present disclosure. FIG. 5 is described below in the context of computing device 210 of FIG. 2.

FIG. 5 illustrates user interface 513 as an example user interface that may be displayed by computing device 210. UI module 220 and notification module 222 of computing device 210 may cause UIC 212 to output user interface 513 for display. User interface 513 includes status bar 514A, application screen 514B, and favorites region 514C. Overlaid in-front or on-top of application screen 514B, and protruding from beneath status bar 514A, user interface 513 includes notification area 515 (e.g., a notification pane). Within notification area 515 are notification messages 516A-516E. Notification message 516A represents one or more notification messages of "important and ongoing" notifications. Notification message 516B represents one or more notification messages of "person-to-person" notifications. Notification message 516C represents one or more notification messages of "regular" notifications. Notification message 516D represents one or more notification messages of "by-the-way" notifications. Notification message 516E represents one or more notification messages of "system informational" notifications.

Notification module 222 and UI module 220 may cause UIC 212 to display notification messages 516 in the order shown in FIG. 5 under the premise that not all notifications are equally important to users, and therefore should not be presented as equal (e.g., in chronological order, etc.). Instead, notification area 515 may allow users to more easily identify and take action on what's important to them in the moment that they view notification area 515. Notification area 515 relies on consistent spatial and visual cues separating different categories of notifications, to create better hierarchy within notification area 515.

Computing device 210 displays notification messages 516A for important and ongoing notifications more prominently than other notification messages. That is, notification messages 516A are displayed at the top of notification area 515 so that when notification area 515 is expanded into view, notification messaged 516A are the first to be displayed. This may allow users to identify and act on what's important to them in the moment. Developers may enable their applications to gain proper prominence for deserving notifications without the effort of customization. Notification module 222 may enable an application to self-designate a notification as being an "important and ongoing" notification.

Computing device 210 displays notification messages 516B for person to person notifications less prominently than important and ongoing notifications, but more prominently than other notifications. That is, notification messages 516B are displayed second from the top of notification area 515 so that when notification area 515 is expanded into view, notification messaged 516B are the second to be displayed. This may allow users to identify open conversations with other users and provide for a quicker way to reply.

Computing device 210 displays notification messages 516D for by-the-way notifications less prominently than important and ongoing notifications and less prominently than person-to-person and regular notification, but more prominently than system informational notifications. That is, notification messages 516B are displayed second from the bottom of notification area 515. This may de-emphasize these less important notifications so users can focus on other more important notifications that more likely care about.

Figure 6:
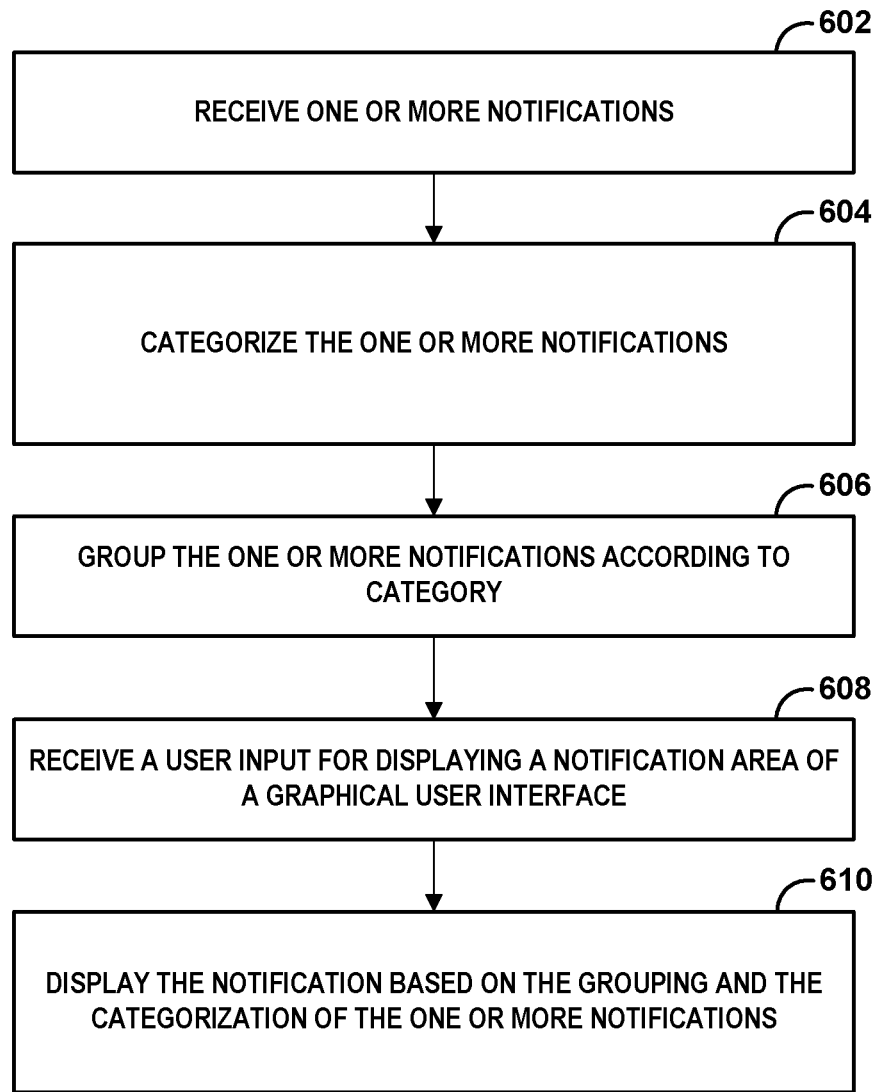
FIG. 6 is a flowchart illustrating example operations performed by an example computing device that is configured to categorize and display notification messages according to a categorical order, in accordance with one or more aspects of the present disclosure.

FIG. 6 is a flowchart illustrating example operations performed by an example computing device that is configured to categorize and display notification messages according to a categorical order, in accordance with one or more aspects of the present disclosure. FIG. 6 is described below in the context of computing device 210 of FIG. 2.

Computing device 210 may receive one or more notifications (602). For example, notification module 222 may receive one or more notifications generated by application modules 230.

Computing device 210 may categorize each of the one or more notifications as either: important and ongoing, person-to-person, regular, by-the-way, or system informational (604). For example, using a rule-based model based on heuristics, a machine-learning model, or other type model, categorization module 224 may categorize each of the one or more notifications.

Computing device 210 may group the one or more notifications according to category (606). For example, notification module 222 may tag or otherwise designate each notification stored at notification queue 232 with its respective category.

Computing device 210 may receive a user input for displaying a notification area of a graphical user interface (608). For example, UI module 220 may receive information from UIC 212 indicating a user of computing device 210 provided an input to display notification area 515 of user interface 513.

Computing device 210 may display the notification area such that notification messages for the system informational notifications are displayed the least prominent, notification messages for the by-the-way notifications are displayed more prominent than the notification messages for the system informational notifications, notification messages for the regular notifications are displayed more prominent than the notification messages for the by-the-way notifications, notification messages for the person-to-person notifications are displayed more prominent than the notification messages for the regular notifications, and notification messages for the important and ongoing notifications are displayed more prominently than the notification messages for the person-to-person notifications (610). For example, UI module 220 may retrieve the pending notifications stored at notification queue 232 and cause UIC 212 to display the notifications within specific regions of notification area 515 that are defined by their category tag. UI module 220 may cause notifications tagged with "important and ongoing" designations to be displayed more prominently, and so on and so forth for each other category of notification.

Figure 7:
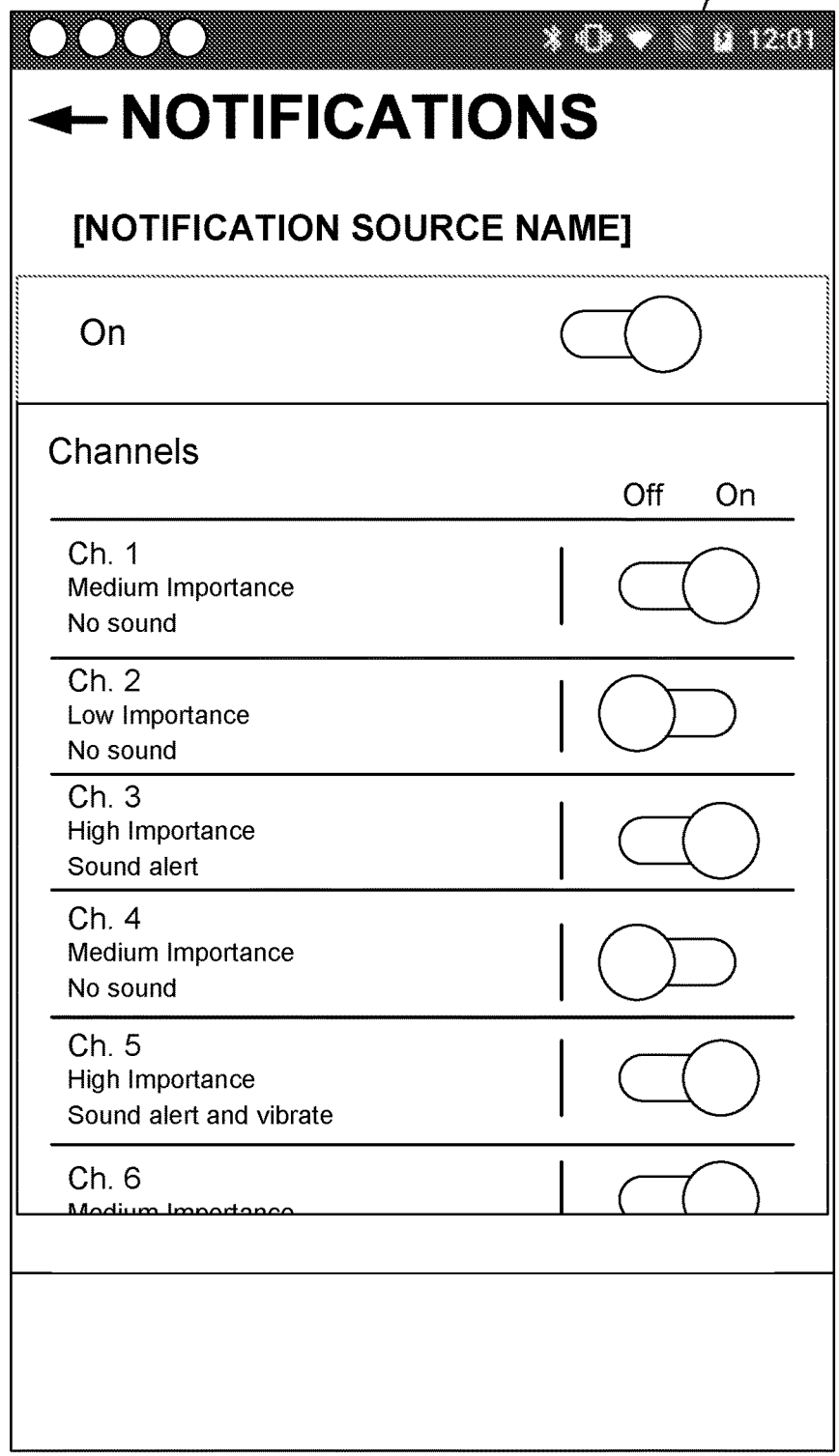
FIG. 7 is a conceptual diagram illustrating an example graphical user interface presented by an example computing device that is configured to enable notification sources to define one or more notification channels, in accordance with one or more aspects of the present disclosure.

FIG. 7 is a conceptual diagram illustrating an example graphical user interface presented by an example computing device that is configured to enable notification sources to define one or more notification channels, in accordance with one or more aspects of the present disclosure. FIG. 7 is described below in the context of computing device 210 of FIG. 2.

FIG. 7 illustrates user interface 713 as an example user interface that may be displayed by computing device 210. UI module 220 and notification module 222 of computing device 210 may cause UIC 212 to output user interface 713 for display. User interface 713 is a universal settings menu provided by computing device 210 to each notification source. Rather than enable notification sources to have their own uniquely defined notification settings screen, notification module 222 may cause computing device 210 to present standardized settings screens for each notification source similar to user interface 713. The standardized settings screen may enable user control over notification settings for a notification source as a whole or finer level control for individual channels. That is, a user may provide input at user interface 713 to enable or disable notifications for an entire application source or for each individual channel defined by the application source. This way, notifications coming from a single notification source can have different attributes or parameters, that are defined by the parameters assigned to the channel for which each notification belongs. Examples of parameters include color, ringtone, vibration pattern, vibration intensity, sound attribute, level of importance or priority, icon, graphical element, font, font size, or any other parameter that defines how an audible, graphical, and/or haptic indication of a notification is output. No longer do notification sources have to settle for a common notification setting for all their notifications.

Figure 8:
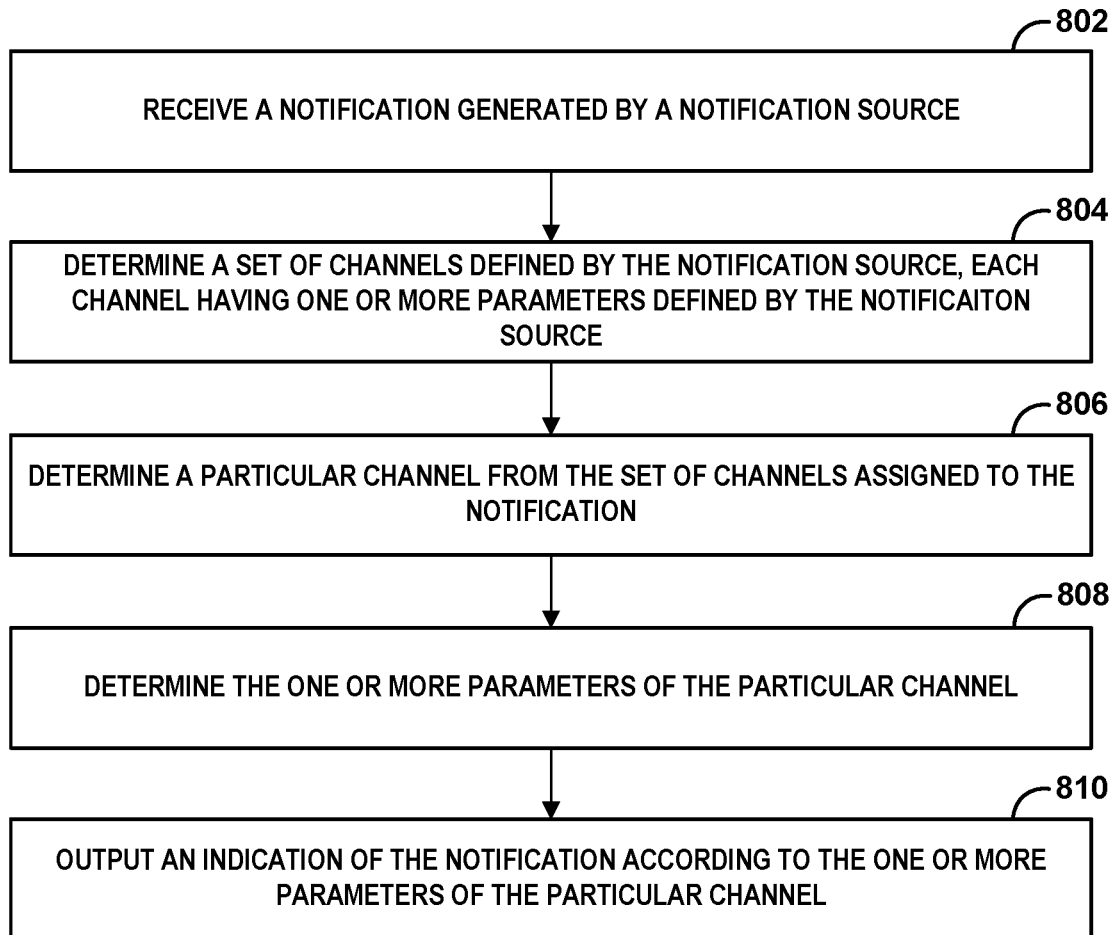
FIG. 8 is a flowchart illustrating example operations performed by an example computing device that is configured to enable notification sources to define one or more notification channels, in accordance with one or more aspects of the present disclosure.

FIG. 8 is a flowchart illustrating example operations performed by an example computing device that is configured to enable notification sources to define one or more notification channels, in accordance with one or more aspects of the present disclosure. FIG. 8 is described below in the context of computing device 210 of FIG. 2.

Computing device 210 may receive a notification generated by a notification source (802). For example, notification module 222 may receive a notification from application module 230B.

Computing device 210 may determine a set of channels defined by the notification source, each channel having one or more parameters defined by the notification source (804). For example, prior to generating the notification, application module 230B may interact with channel module 226 via an API to define one or more channels for its notifications. Application module 230B may, through the API, assign values to parameters of each channel and send the values and parameters to channel module 226. Channel module 226 may store the channel values and parameters.

Computing device 210 may determine a particular channel from the set of channels assigned to the notification (806). For example, notification module 222 may analyze the metadata associated with the notification from application module 230B to determine the particular channel it was assigned to.

Computing device 210 may determine the one or more parameters of the particular channel (808). For example, channel module 226 may look up the one or more parameters of the channel determined from the metadata of the notification.

Computing device 210 may output an indication of the notification according to the one or more parameters of the particular channel (810). For example, notification module 222 may store the notification data at notification queue 232 along with the one or more parameters of the particular channel so that when UI module 220 retrieves the notification for subsequent output as an indication as part of a user interface, UI module 220 may cause the indication of the notification to be output and have the qualities defined by the one or more parameters of the particular channel.

FIGS. 9A through 9F are a conceptual diagrams illustrating example graphical user interfaces presented by an example computing device that is configured to display notification graphical elements within a notification area of a graphical user interface, in accordance with one or more aspects of the present disclosure. FIGS. 9A through 9F are described below in the context of computing device 210 of FIG. 2.

FIGS. 9A through 9F illustrate user interface 913 as an example user interface that may be displayed by computing device 210. UI module 220 and notification module 222 of computing device 210 may cause UIC 212 to output user interface 913 for display. User interface 913 includes status bar 914A, application screen 914B, and favorites region 914C.

Figure 9A:
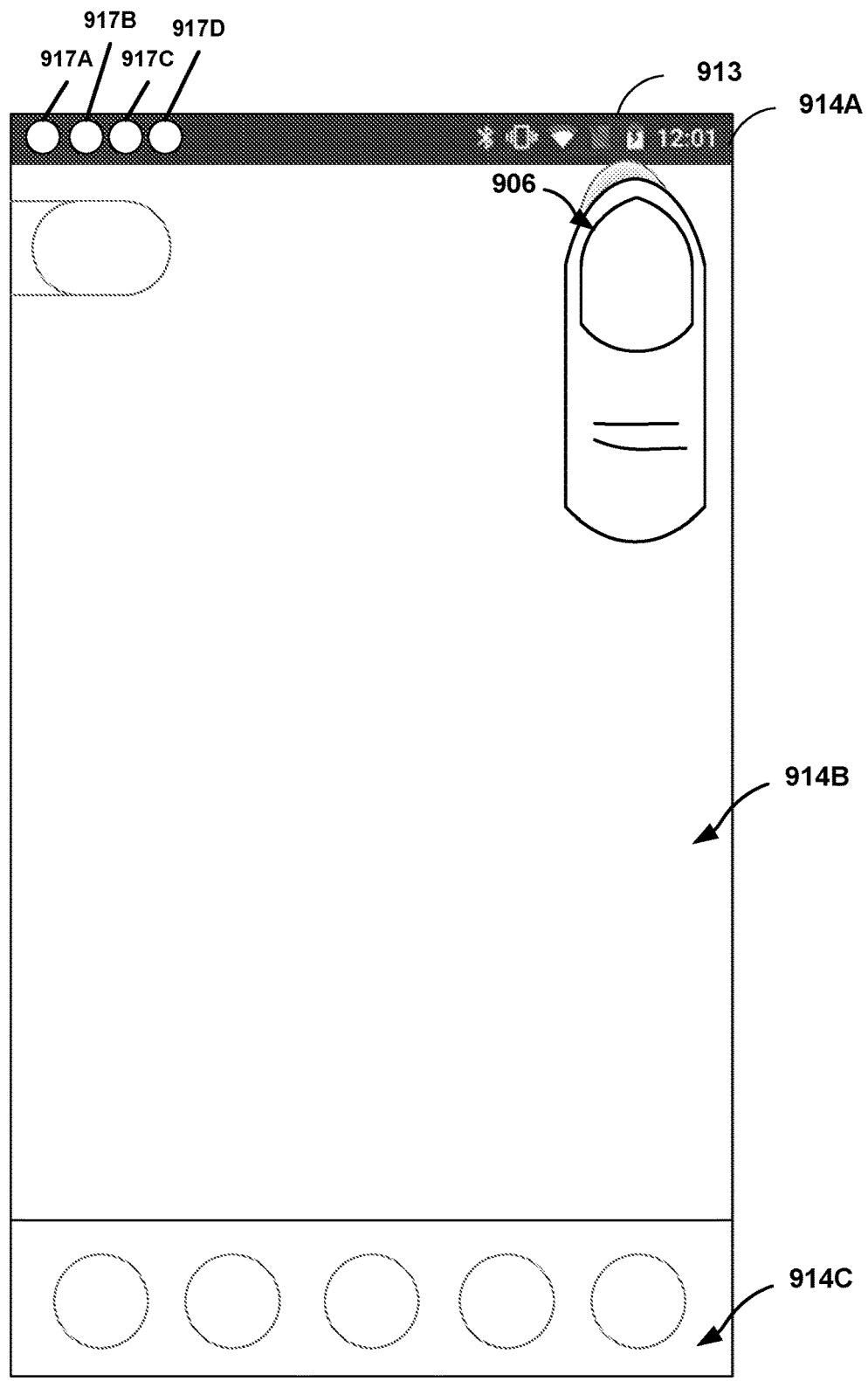
FIGS. 9A through 9F are conceptual diagrams illustrating example graphical user interfaces presented by an example computing device that is configured to display notification graphical elements within a notification area of a graphical user interface, in accordance with one or more aspects of the present disclosure.

FIG. 9A shows notification graphical elements 917A-917D (collectively "notification graphical elements 917") displayed as a set of graphical elements within status bar 914A. Each notification graphical element 917 within the set of graphical elements corresponds to a pending notification or group of pending notifications. A user may provide a swipe gesture 906 to cause computing device 210 to display notification area 915.

Figure 9B:
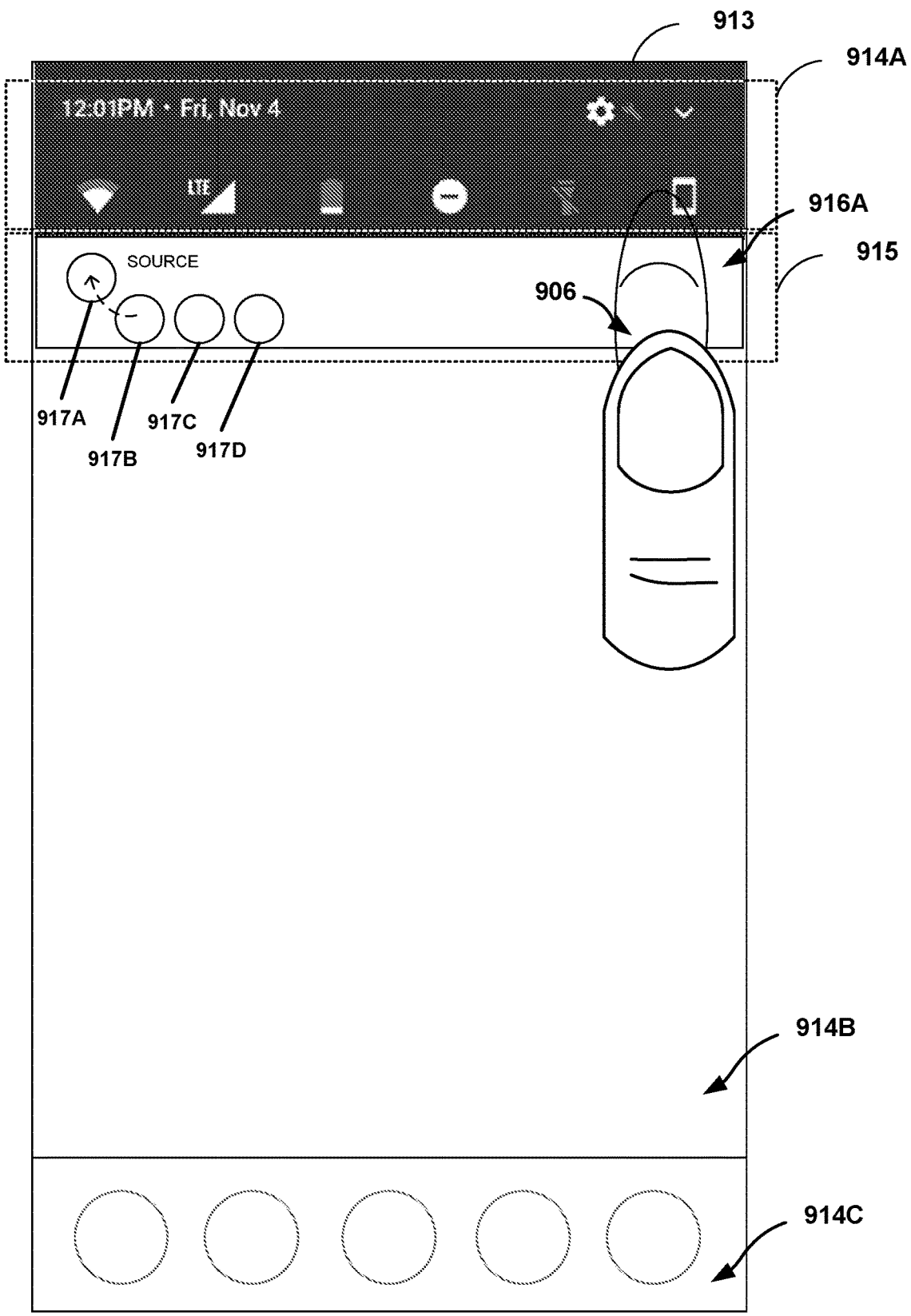

FIG. 9B shows how notification area 915 (e.g., a notification pane) extends downward from beneath status bar 914A in response to swipe gesture 906. FIG. 9B further shows how UI module 220 may cause UIC 212 to display the set of graphical elements 917 no longer within status bar 914A but instead, within notification area 915A, near a leading edge of notification area 915A as notification area 915A comes into view.

Also shown in FIG. 9B, as notification message 916A comes into view, graphical element 917A, from the set of graphical elements 917 displayed near the leading edge of notification area 915, that corresponds to the notification associated with notification message 916A is removed from the set of graphical elements 917 and animated so that it moves into position within notification message 916A. This way, a user is cued to the fact that graphical element 917A corresponds to notification message 916A. Also, by counting the remaining graphical elements in the set of graphical elements 917, the user can obtain visual confirmation as to a quantity of remaining (unfurled) notification messages remain within notification area 91A.

Figure 9C:
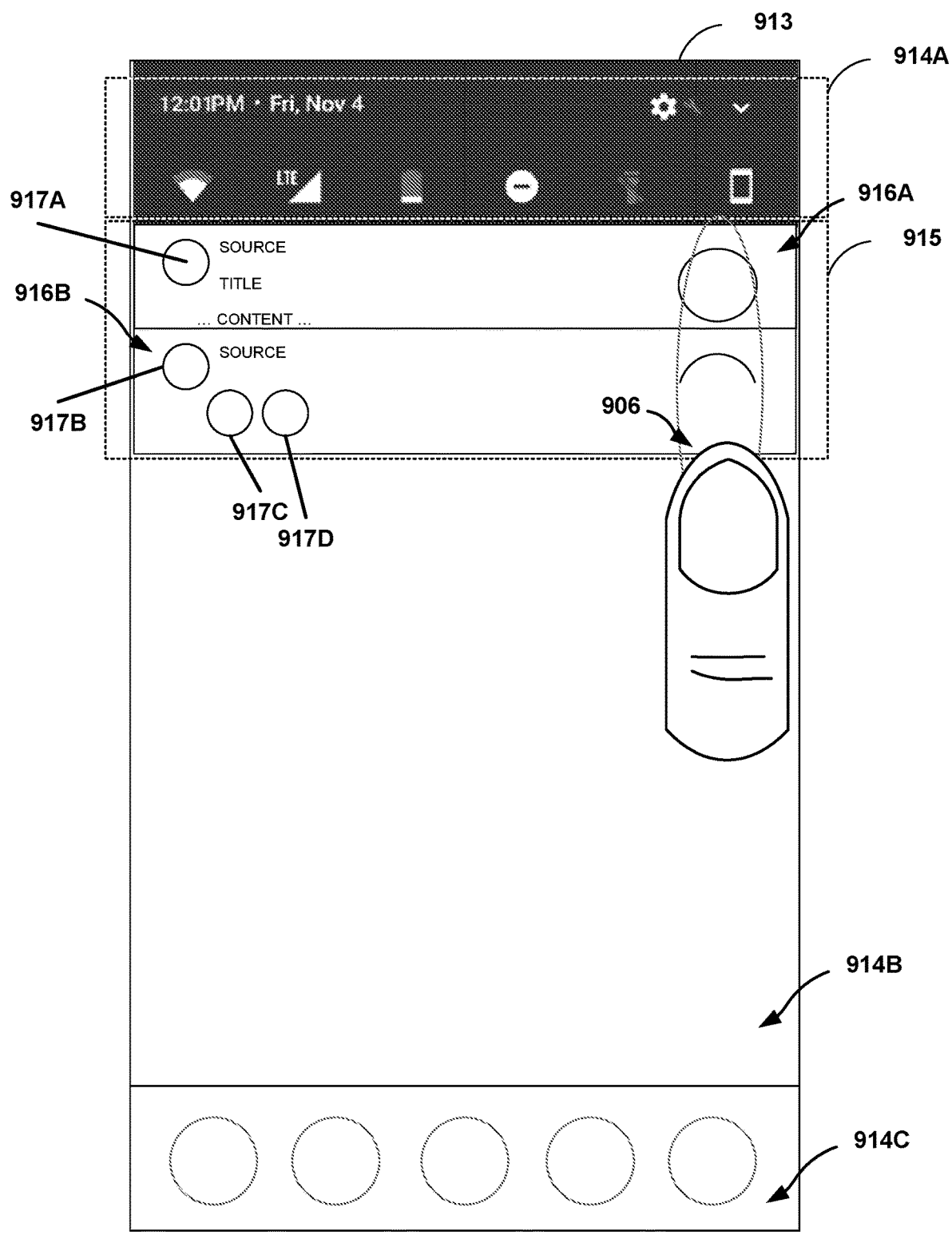

Also shown in FIG. 9C, as the size (e.g., the length) of gesture 906 increases, UI module 220 may cause the size (e.g., length) of notification area 915 to increase proportionately as well. As notification message 916B comes into view, graphical element 917B, from the set of graphical elements 917 displayed near the leading edge of notification area 915, that corresponds to the notification associated with notification message 916B is removed from the set of graphical elements 917 and animated so that it moves into position within notification message 916B.

Figure 9D:
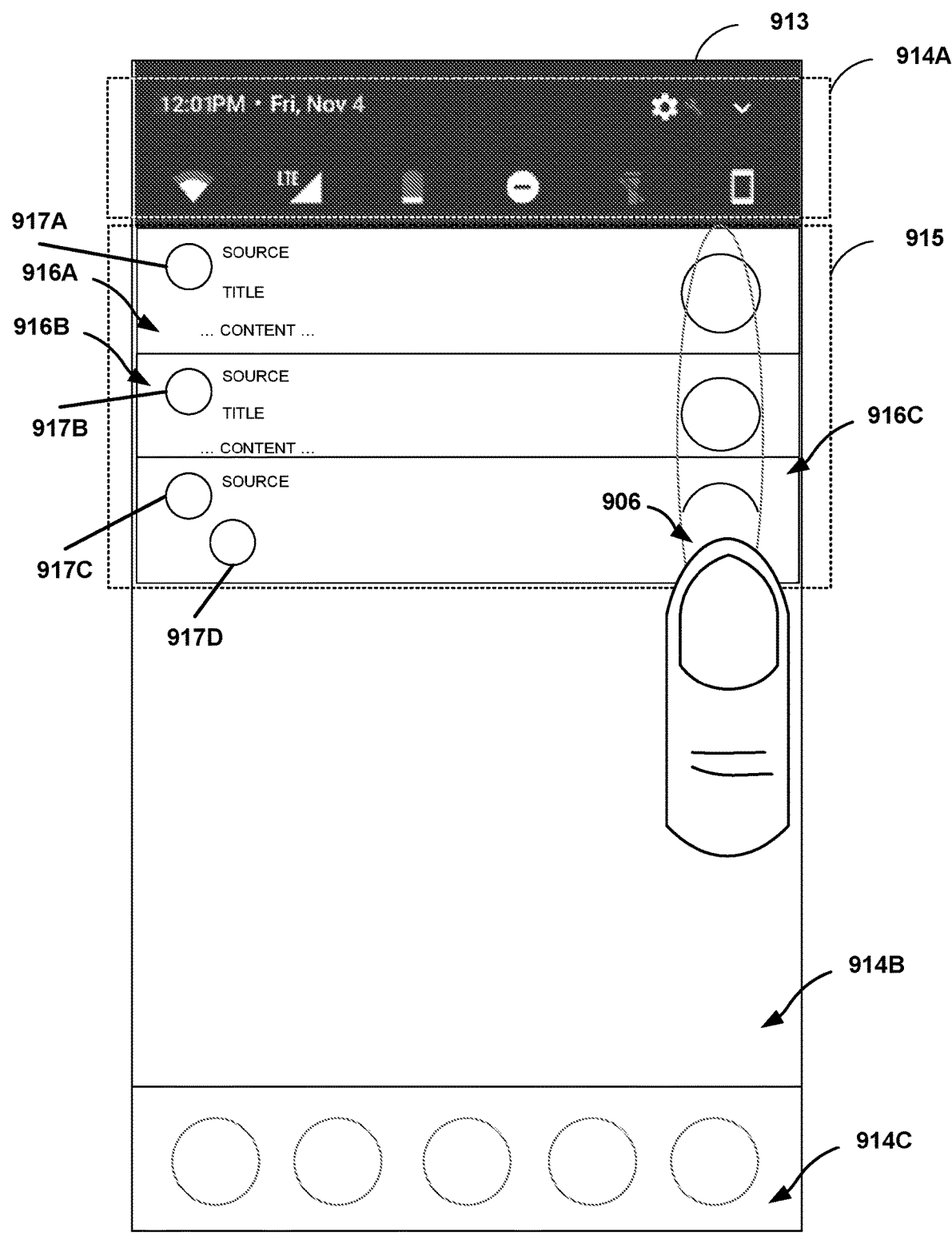
Figure 9E:
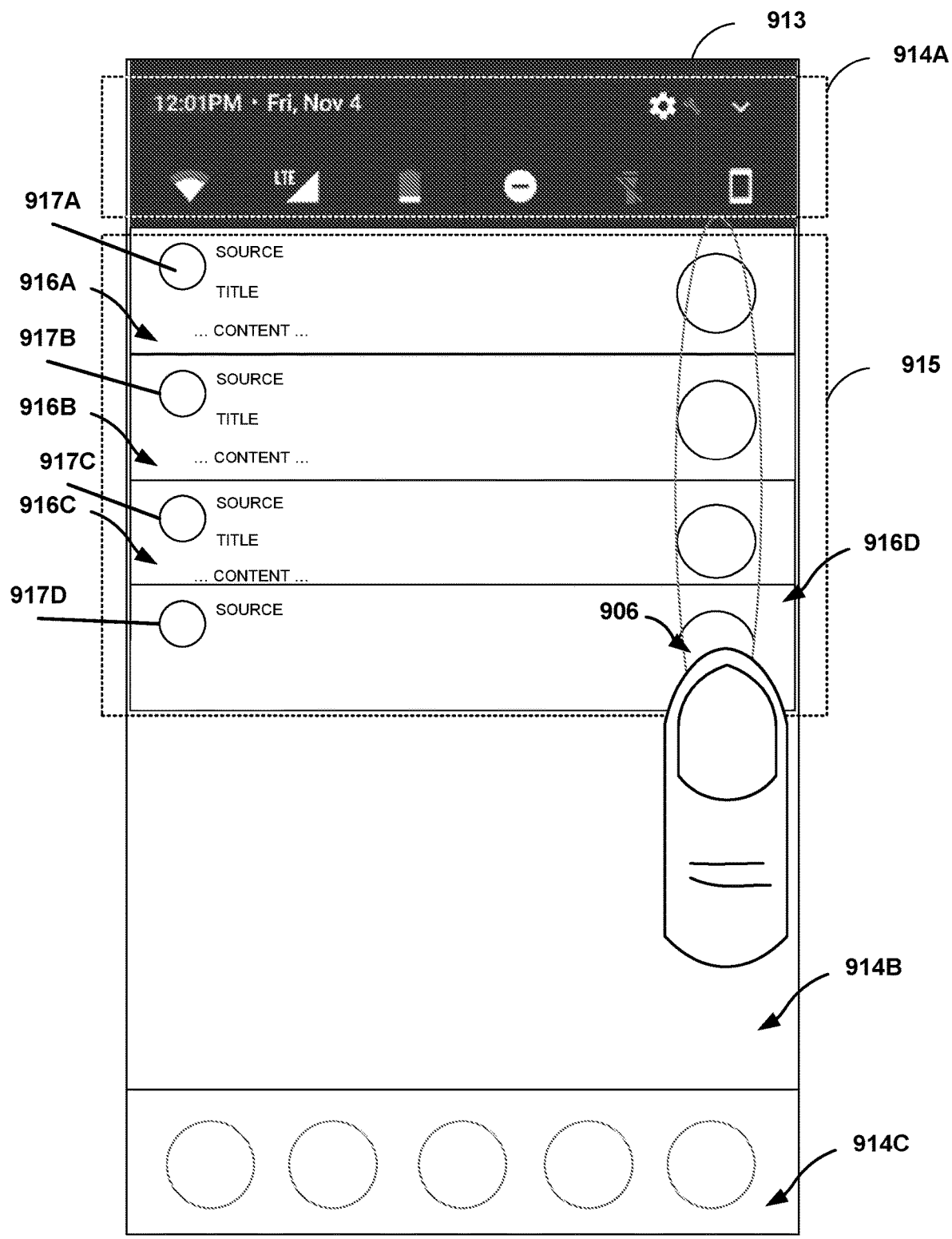

Also shown in FIGS. 9D and 9E, as the size of gesture 906 increases further, UI module 220 may further increase the size of notification area 915. As notification message 916C comes into view in FIG. 9D, graphical element 917C, from the set of graphical elements 917 displayed near the leading edge of notification area 915, that corresponds to the notification associated with notification message 916C is removed from the set of graphical elements 917 and animated so that it moves into position within notification message 916C. As notification message 916D comes into view in FIG. 9E, graphical element 917D, from the set of graphical elements 917 displayed near the leading edge of notification area 915, that corresponds to the notification associated with notification message 916D is removed from the set of graphical elements 917 and animated so that it moves into position within notification message 916D.

Figure 9F:
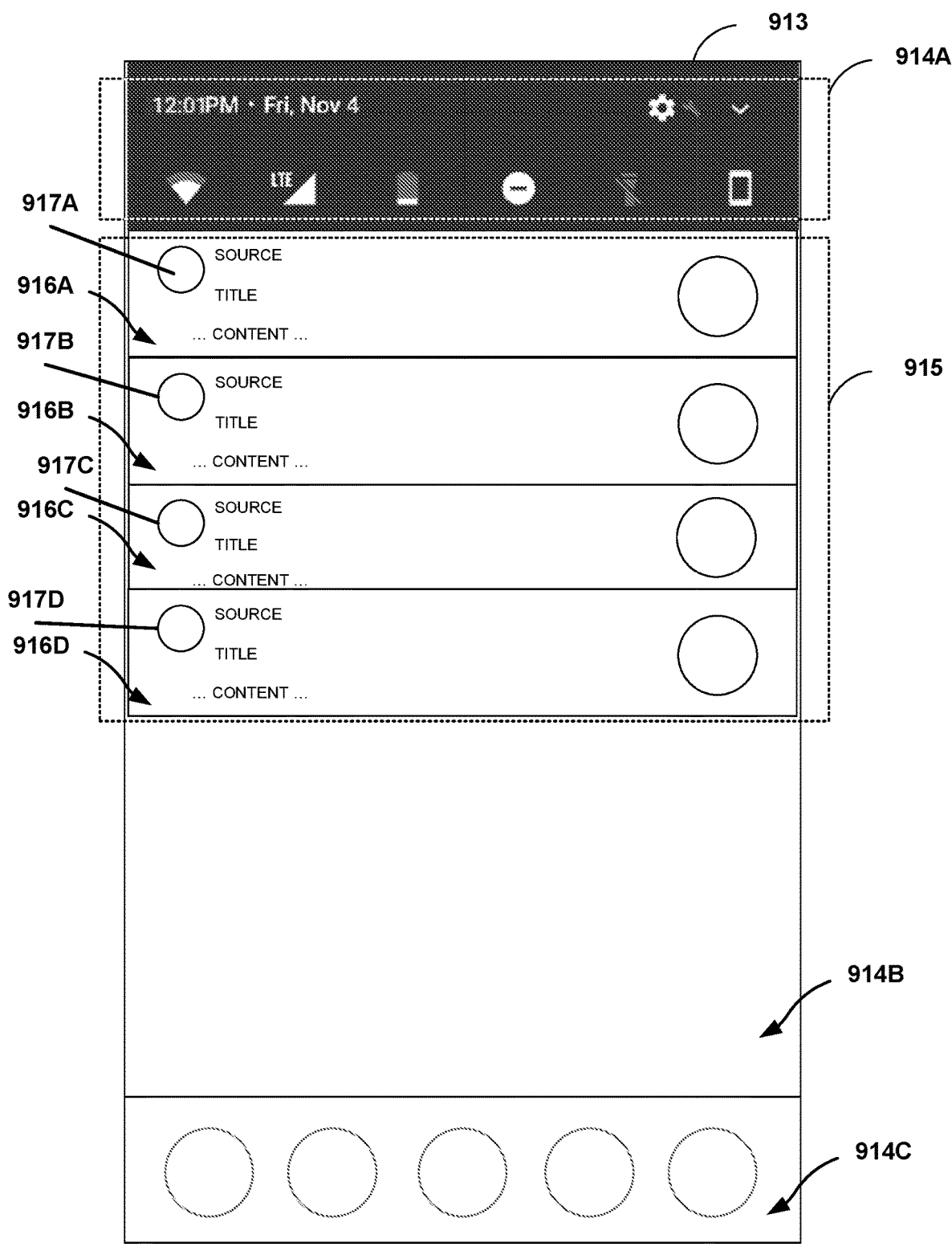

Finally, as shown in FIG. 9F, with notification area 915 expanded to is maximum size, each graphical element from the set of graphical elements 917 has been removed and positioned within a corresponding notification message 916. It should be understood, the example of FIGS. 9A-9F may be carried out by computing device 210 in reverse. That is, as notification area 915 is collapsed, and notification messages that are collapsed from view and associated with pending notifications, may have their respective graphical elements 917 added back to the set of graphical elements 917 that is displayed at the leading edge of notification area 915 until notification area 915 is completely collapsed, at which time, computing device 210 may cause the set of graphical elements 917 to again be displayed in status bar 914A.

Figure 10A:
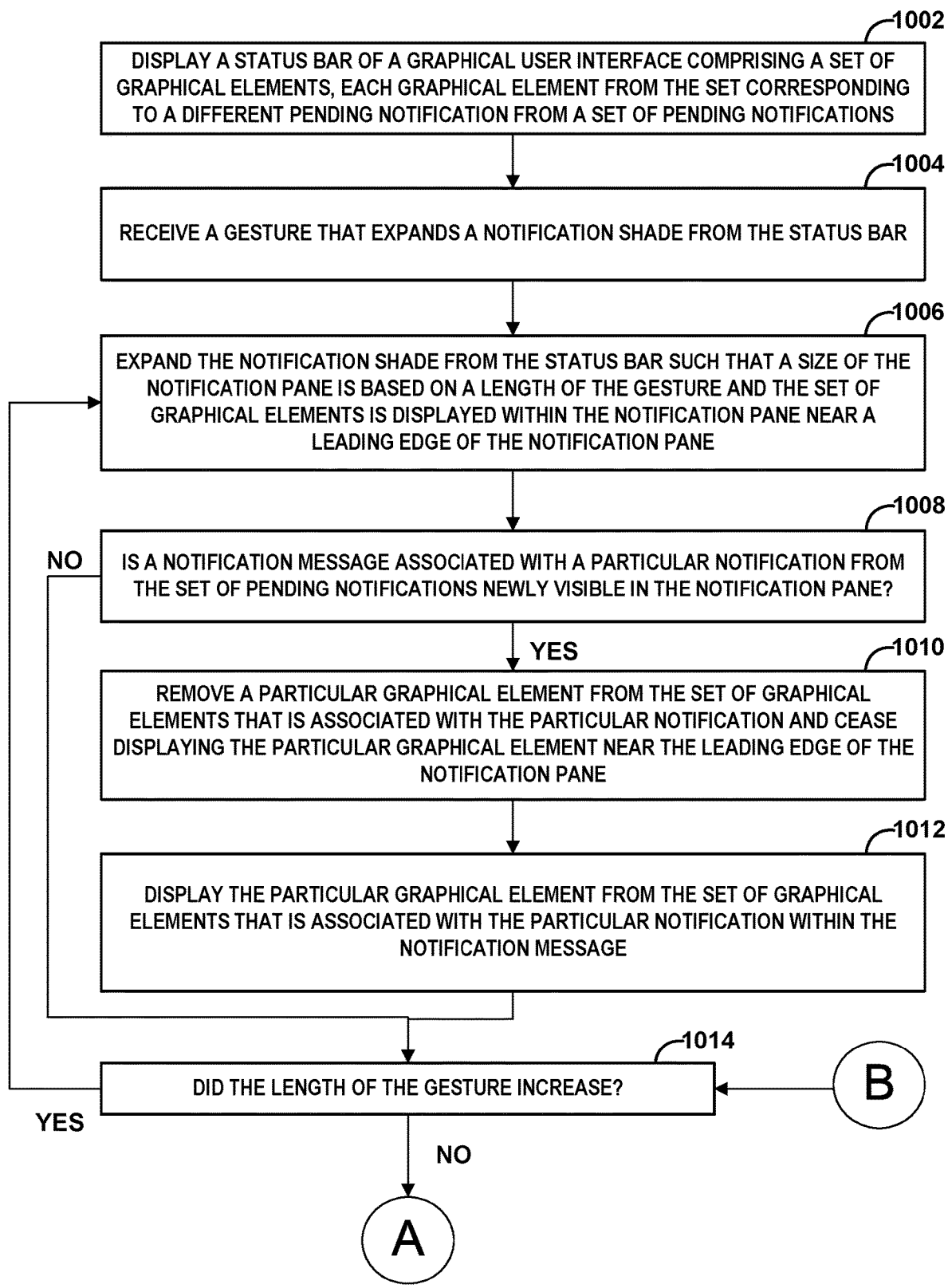
FIGS. 10A and 10B are flowcharts illustrating example operations performed by an example computing device that is configured to display notification graphical elements within a notification area of a graphical user interface, in accordance with one or more aspects of the present disclosure.
Figure 10B:
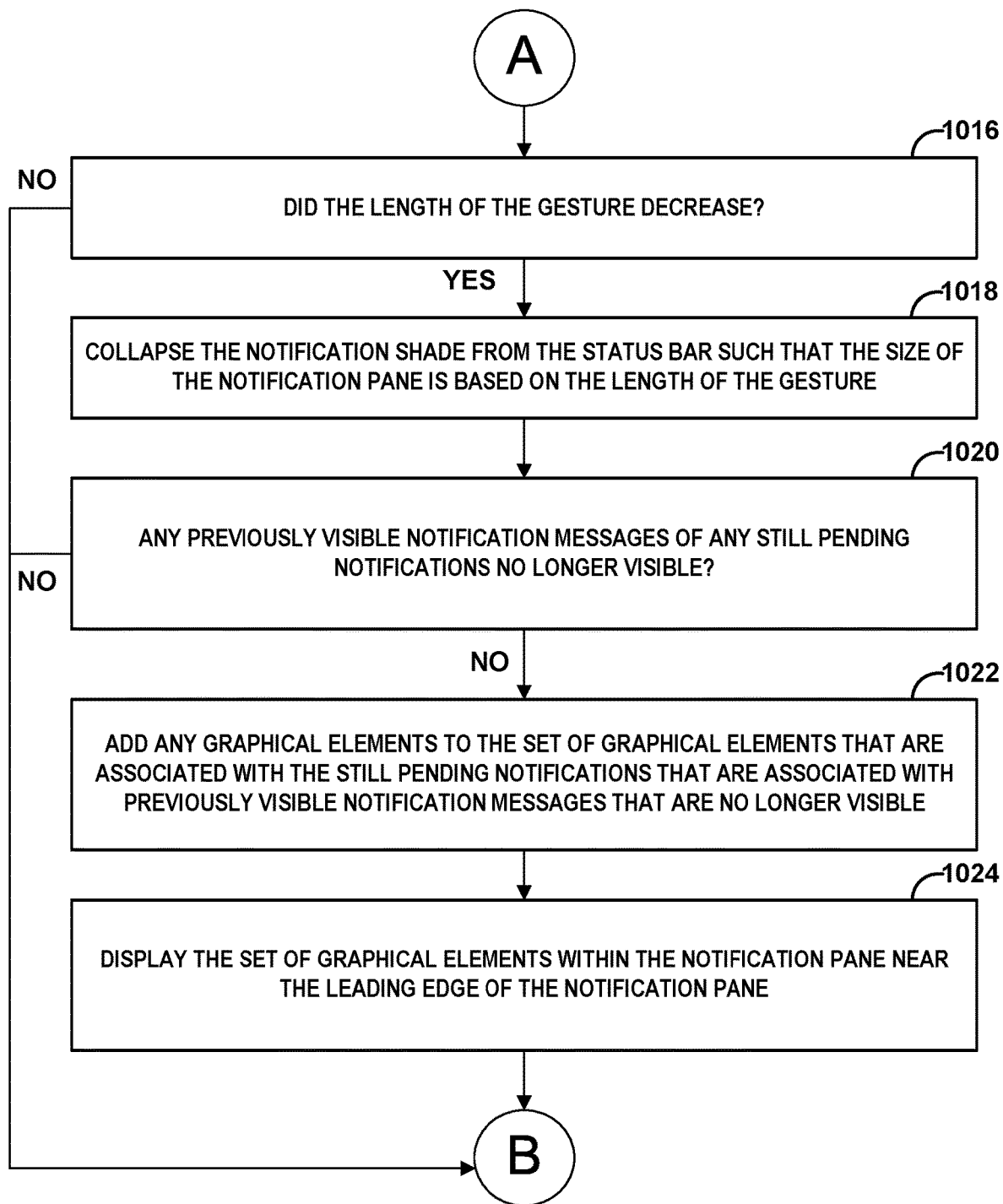

FIGS. 10A and 10B are flowcharts illustrating example operations performed by an example computing device that is configured to display notification graphical elements within a notification area of a graphical user interface, in accordance with one or more aspects of the present disclosure. FIGS. 10A and 10B are described below in the context of computing device 210 of FIG. 2.

As shown in FIG. 10A, computing device 210 may display a status bar of a graphical user interface comprising a set of graphical elements, each graphical element from the set corresponding to a different pending notification from a set of pending notifications (1002). For example, computing device 210 may display user interface 913 at UIC 212 including a set of graphical elements 917.

Computing device 210 may receive a gesture that expands a notification shade from the status bar (1004). For example, UI module 220 may receive an indication from UIC 212 of gesture 906 being detected at status bar 914A. UI module 220 may determine that gesture 906 is a user command to expand notification area 915.

Computing device 210 may expand the notification shade from the status bar such that a size of the notification pane is based on a length of the gesture and the set of graphical elements is displayed within the notification pane near a leading edge of the notification pane (1006). For example, UI module 220 may cause UID 212 to increase the length of notification area 915 proportionate to an increase in length of gesture 906. In this way, UI module 220 may cause a leading edge of notification area 915 to follow the input unit that is making gesture 906.

Computing device 210 may determine whether a notification message associated with a particular notification from the set of pending notifications is newly visible in the notification pane (1008). For example, UI module 220 may determine whether any notification messages 916 are visible that are associated with any of the graphical elements from the set of graphical elements 917.

In response to determining that no notification messages are newly visible (1008, No branch), computing device 210 may proceed to operation 1014. However, in response to determining that a notification message is newly visible (1008, Yes branch), computing device 210 may remove a particular graphical element from the set of graphical elements that is associated with the particular notification and cease displaying the particular graphical element near the leading edge of the notification pane (1010). Computing device 210 may display the particular graphical element from the set of graphical elements that is associated with the particular notification within the notification message (1012). For example, as notification message 916A comes into view as the size of gesture 906 grows, UI module 220 may cause graphical element 917A to move from being positioned near a leading edge of notification area 915 and into a position within notification message 916A.

Computing device 210 may determine whether the length of the gesture increased (1014). In response to determining that the length of the gesture increases (1014, Yes branch), computing device 210 may repeat operations (1006)-(1014). For example, UI module 220 may cause each of graphical elements 917 to move from being positioned near the leading edge of notification area 915 to being positioned within a respective notification message 916.

In response to determining that the length of the gesture did not increase (1014, No branch), computing device 210 may proceed to step "A" which continues with the operations shown in FIG. 10B.

As shown in FIG. 10A, computing device 210 may determine whether the length of the gesture decreased (1016). In response to determining that the length of the gesture did not decrease (1016, No branch), computing device 210 may proceed to step "B" which continues with operation 1014 of FIG. 10A.

In response to determining that the length of the gesture decreased (1016, Yes branch), computing device 210 may collapse the notification shade from the status bar such that the size of the notification pane is based on the length of the gesture (1018). For example, a user may provide a gesture similar to gesture 906, but in the opposite direction. So with notification area 915 expanded, gesture 906 may move from the leading edge of notification area 915A back up towards status bar 914A so as to collapse notification area 915.

Computing device 210 may determine whether any previously visible notification messages of any still pending notifications are no longer visible (1020). In response to determining that no previously visible notification messages of any still pending notifications are no longer visible (1020, No branch), computing device 210 may proceed to step "B" which continues with operation 1014 of FIG. 10A. For example, if there are no more pending notifications, UI module 220 need not determine whether to display any graphical elements of notifications at the leading edge of notification area 915 and eventually status bar 914A.

In response to determining that at least one previously visible notification message of a still pending notifications is no longer visible (1020, Yes branch), computing device 210 may add any graphical elements to the set of graphical elements that are associated with the still pending notifications that are associated with previously visible notification messages that are no longer visible (1022). Computing device 210 may display the set of graphical elements within the notification pane near the leading edge of the notification pane (1024).

For example, as notification area collapsed, UI module 220 reposition any graphical elements 917 that are associated with still pending notifications, to move position from being displayed within a respective notification message 916 to be displayed at the leading edge of notification area 915. When gesture 906 reached status bar 914A, UI module 220 may cause any graphical elements 917 displayed in the leading edge of notification area 915 to be displayed within status bar 914A.

Clause 1. A method comprising: displaying, by a computing device, in a status bar of a graphical user interface, a set of graphical elements, each graphical element from the set of graphical elements corresponding to a different pending notification from a group of pending notifications; expanding, by the computing device, a notification shade from the status bar; while expanding the notification shade from the status bar, displaying, by the computing device, the set of graphical elements within an area of the notification shade that is adjacent to a leading edge of the notification shade; determining, by the computing device, whether a particular notification message associated with a particular notification from the group of pending notifications is newly visible in the notification shade; and responsive to determining that the particular notification message is newly visible: removing, by the computing device, from the area of the notification shade that is adjacent to the leading edge of the notification shade, a particular graphical element from the set of graphical elements that corresponds to the particular notification; and displaying, by the computing device, the particular graphical element within the particular notification message.

Clause 2. The method of clause 1, wherein a quantity of graphical elements that are displayed within the area of the notification shade that is adjacent to the leading edge of the notification shade is indicative of a quantity of notification messages that have yet to be displayed within the notification shade.

Clause 3. The method of any one of clauses 1 or 2, wherein displaying the particular graphical element within the particular notification message comprises animating the particular graphical element to move from the area of the notification shade that is adjacent to the leading edge of the notification shade and into a region of the notification shade at which the particular notification message is displayed.

Clause 4. The method of any one of clauses 1-3, wherein the particular notification is an initial notification, the particular notification message is an initial notification message, and the particular graphical element is an initial graphical element, the method further comprising: after displaying the initial graphical element within the initial notification message, determining, by the computing device, whether a subsequent notification message associated with a subsequent notification from the group of pending notifications is newly visible in the notification shade, the subsequent notification being different than the initial notification; and responsive to determining that the subsequent notification message is newly visible: removing, by the computing device, from the area of the notification shade that is adjacent to the leading edge of the notification shade, a subsequent graphical element from the set of graphical elements that corresponds to the subsequent notification; and displaying, by the computing device, the subsequent graphical element within the subsequent notification message.

Clause 5. The method of clause 4, wherein the initial graphical element is displayed adjacent to the subsequent graphical element when both the initial and subsequent graphical elements are displayed within the area of the notification shade that is adjacent to the leading edge of the notification shade.

Clause 6. The method of any one of clauses 4 or 5, wherein the initial graphical element is displayed adjacent to the subsequent graphical element when both the initial and subsequent graphical elements are displayed within the status bar.

Clause 7. The method of any one of clauses 4-6, wherein the initial notification message is displayed adjacent to the subsequent notification message when both the initial and subsequent notification messages are displayed within the notification shade.

Clause 8. The method of any one of clauses 1-7, wherein each graphical element from the set of graphical elements is indicative of content of the different pending notification from the group of notifications to which that graphical element corresponds.

Clause 9. The method of any one of clauses 1-8, wherein each graphical element from the set of graphical elements is indicative of a notification channel of the different pending notification from the group of notifications to which that graphical element corresponds.

Clause 10. The method of any one of clauses 1-9, wherein expanding the notification shade from the status bar is in response to receiving, by the computing device, user input that expands the notification shade from the status bar.

Clause 11. The method of clause 10, wherein the user input is a gesture detected at a location of a presence-sensitive display at which the graphical user interface is displayed, and wherein expanding the notification shade from the status bar comprises expanding the notification shade from the status bar such that a length of the notification shade is based on a length of the gesture.

Clause 12. A computing device comprising at least one processor configured to perform any one of the methods of clauses 1-11.

Clause 13. A computer-readable storage medium comprising instructions that when executed, cause at least one processor of a computing device to perform any one of the methods of clauses 1-11.

Clause 14. A computer program product comprising instructions which, when the program is executed by at least one processor of a computing device, cause the computing device to carry out any one of the methods of clauses 1-11.

Clause 15. A system comprising means for performing any one of the methods of clauses 1-11.

Clause 16. A method comprising: receiving, by a computing device, from a source, a notification; determining, by the computing device, content of the notification; determining, by the computing device, based at least in part on the content, a notification badge that reflects the content; determining, by the computing device, whether any other pending notifications received by the computing device are associated with the source; responsive to determining that there are other pending notifications received by the computing device are associated with the source, updating, by the computing device, the notification badge to reflect the content of the notification and content of the other pending notifications; displaying, by the computing device, the notification badge at or near a graphical element for launching the source of the notification; detecting, by the computing device, a long-press gesture that selects the graphical element for launching the source of the notification; and responsive to detecting the long-press gesture, displaying, by the computing device, a notification preview that includes a respective notification message for the notification and any other pending notifications.

Clause 17. A method comprising: receiving, by a computing device, from a source, one or more notifications; categorizing, by the computing device, each of the one or more notifications as either: important and ongoing, person-to-person, regular, by-the-way, or system informational; grouping, by the computing device, the one or more notifications according to category; receiving, by the computing device, a user input for displaying a notification area of a graphical user interface; and displaying, by the computing device, the notification area such that: notification messages for the system informational notifications are displayed the least prominent, notification messages for the by-the-way notifications are displayed more prominent than the notification messages for the system informational notifications, notification messages for the regular notifications are displayed more prominent than the notification messages for the by-the-way notifications, notification messages for the person-to-person notifications are displayed more prominent than the notification messages for the regular notifications, and notification messages for the important and ongoing notifications are displayed more prominently than the notification messages for the person-to-person notifications.

Clause 18. A method comprising: receiving, by a computing device, a notification generated by a notification source; determining, by the computing device, a set of channels defined by the notification sources, each channel having one or more parameters defined by the notification source; determining, by the computing device, a particular channel from the set of channels assigned to the notification; determining, by the computing device, one or more parameters of the particular channel; and outputting, by the computing device, an indication of the notification according to the one or more parameters of the particular channel.

Clause 19. A method comprising: displaying, by a computing device, a status bar of a graphical user interface comprising a set of graphical elements, each graphical element from the set corresponding to a different pending notification from a set of pending notifications; receiving, by the computing device, a gesture that expands a notification shade from the status bar; expanding, by the computing device, the notification shade from the status bar such that a size of the notification pane is based on a length of the gesture and the set of graphical elements is displayed within the notification pane near a leading edge of the notification pane; determining, by the computing device, whether a notification message associated with a particular notification from the set of pending notifications is newly visible in the notification pane; and responsive to determining that a notification message is newly visible: removing, by the computing device, a particular graphical element from the set of graphical elements that is associated with the particular notification; ceasing, by the computing device, display of the particular graphical element near the leading edge of the notification pane; and displaying, by the computing device, the particular graphical element from the set of graphical elements that is associated with the particular notification within the notification message.

Clause 20. A computing device comprising at least one processor and a memory comprising instructions that, when executed, cause the at least one processor to perform any one of the methods of clauses 16-19.

Clause 21. A computer-readable storage medium comprising instructions that, when executed, cause at least one processor of a computing device to perform any one of the methods of clauses 16-19.

Clause 22. A system comprising means for performing any one of the methods of clauses 16-19.

Clause 23. A computer program product comprising instructions which, when the program is executed by at least one processor of a computing device, cause the computing device to carry out any one of the methods of claims 16-19.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    displaying, by a computing device, in a status bar of a graphical user interface, a set of graphical elements, each graphical element from the set of graphical elements corresponding to a different pending notification from a group of pending notifications;
    receiving, by the computing device, a gesture user input detected at a location of a presence-sensitive display at which the graphical user interface is displayed;
    responsive to receiving the user input, expanding, by the computing device, a notification shade from the status bar; and
    while expanding the notification shade from the status bar:
        displaying, by the computing device, the set of graphical elements within a first area of the notification shade that is adjacent to a leading edge of the notification shade;
        determining, by the computing device, whether a particular notification message associated with a particular notification from the group of pending notifications is newly visible in the notification shade; and
        responsive to determining that the particular notification message is newly visible:
            displaying, by the computing device, an animation of a particular graphical element from the set of graphical elements moving from the first area of the notification shade that is adjacent to the leading edge of the notification shade to a second area of the notification that is within the particular notification message, wherein the particular graphical element corresponds to the particular notification.

2. The method of claim 1, wherein a quantity of graphical elements that are displayed within the first area of the notification shade that is adjacent to the leading edge of the notification shade is indicative of a quantity of notification messages that have yet to be displayed within the notification shade.

3. The method of claim 1, wherein the particular notification is an initial notification, the particular notification message is an initial notification message, the particular graphical element is an initial graphical element, and while expanding the notification shade from the status bar, the method further comprising:
    after displaying the animation, determining, by the computing device, whether a subsequent notification message associated with a subsequent notification from the group of pending notifications is newly visible in the notification shade, the subsequent notification being different than the initial notification; and
    responsive to determining that the subsequent notification message is newly visible:
        removing, by the computing device, from the first area of the notification shade that is adjacent to the leading edge of the notification shade, a subsequent graphical element from the set of graphical elements that corresponds to the subsequent notification; and
        displaying, by the computing device, the subsequent graphical element within the subsequent notification message.

4. The method of claim 3, wherein the initial graphical element is displayed adjacent to the subsequent graphical element when both the initial and subsequent graphical elements are displayed within the first area of the notification shade that is adjacent to the leading edge of the notification shade.

5. The method of claim 3, wherein the initial graphical element is displayed adjacent to the subsequent graphical element when both the initial and subsequent graphical elements are displayed within the status bar.

6. The method of claim 3, wherein the initial notification message is displayed adjacent to the subsequent notification message when both the initial and subsequent notification messages are displayed within the notification shade.

7. The method of claim 1, wherein each graphical element from the set of graphical elements is indicative of content of the different pending notification from the group of notifications to which that graphical element corresponds.

8. The method of claim 1, wherein each graphical element from the set of graphical elements is indicative of a notification channel of the different pending notification from the group of notifications to which that graphical element corresponds.

9. A computing device comprising:
    a presence-sensitive display device that displays, in a status bar of a graphical user interface, a set of graphical elements, each graphical element from the set of graphical elements corresponding to a different pending notification from a group of pending notifications, detects a user input at a location of the presence-sensitive display at which the graphical user interface is displayed, and, in response to the user input, displays a notification shade expanding from the status bar such that a length of the notification shade is based on a length of the user input;
    one or more processors; and
    a storage component storing instructions that, when executed, cause the one or more processors to, while the display device is displaying the notification shade visually expanding from the status bar:
        causes the display device to display the set of graphical elements within a first area of the notification shade that is adjacent to a leading edge of the notification shade;
        determine whether a particular notification message associated with a particular notification from the group of pending notifications is newly visible in the notification shade; and
        responsive to determining that the particular notification message is newly visible:
            cause the display device to display an animation of a particular graphical element from the set of graphical elements moving from the first area of the notification shade that is adjacent to the leading edge of the notification shade to a second area of the notification shade that is within the particular notification message, wherein the particular graphical element corresponds to the particular notification.

10. The computing device of claim 9, wherein a quantity of graphical elements that are displayed within the first area of the notification shade that is adjacent to the leading edge of the notification shade is indicative of a quantity of notification messages that have yet to be displayed within the notification shade.

11. The computing device of claim 9,
    wherein the particular notification is an initial notification, the particular notification message is an initial notification message, the particular graphical element is an initial graphical element, and wherein the instructions further cause the one or more processors to, while expanding the notification shade from the status bar:

after the display device displays the animation, determine whether a subsequent notification message associated with a subsequent notification from the group of pending notifications is newly visible in the notification shade, the subsequent notification being different than the initial notification; and responsive to determining that the subsequent notification message is newly visible:

remove, from the first area of the notification shade that is adjacent to the leading edge of the notification shade, a subsequent graphical element from the set of graphical elements that corresponds to the subsequent notification; and cause the display device to display the subsequent graphical element within the subsequent notification message.

12. The computing device of claim 9, wherein each graphical element from the set of graphical elements is indicative of content of the different pending notification from the group of notifications to which that graphical element corresponds.

13. The computing device of claim 9, wherein each graphical element from the set of graphical elements is indicative of a notification channel of the different pending notification from the group of notifications to which that graphical element corresponds.

14. A computer-readable storage medium comprising instructions, that when executed, cause at least one processor of a computing device to:

output, for display in a status bar of a graphical user interface, a set of graphical elements, each graphical element from the set of graphical elements corresponding to a different pending notification from a group of pending notifications;

receive an indication of a gesture user input detected a location of a presence-sensitive display at which the graphical user interface is displayed;

responsive to receiving the indication of the gesture user input, output, for display, a notification shade expanding from the status bar such that a length of the notification shade is based on a length of the gesture user input; and while the display device is displaying the notification shade visually expanding from the status bar:

output, for display, the set of graphical elements within a first area of the notification shade that is adjacent to a leading edge of the notification shade;

determine whether a particular notification message associated with a particular notification from the group of pending notifications is newly visible in the notification shade; and responsive to determining that the particular notification message is newly visible:

output, for display, an animation of a particular graphical element from the set of graphical elements moving from the first area of the notification shade that is adjacent to the leading edge of the notification shade to a second area of the notification shade that is within the particular notification message, wherein the particular graphical element corresponds to the particular notification.

* * * * *